(12) United States Patent
Cheadle et al.

(10) Patent No.: US 9,989,322 B2
(45) Date of Patent: Jun. 5, 2018

(54) HEAT RECOVERY DEVICE WITH IMPROVED LIGHTWEIGHT FLOW COUPLING CHAMBER AND INSERTABLE VALVE

(71) Applicant: Dana Canada Corporation, Oakville (CA)

(72) Inventors: Brian E. Cheadle, Brampton (CA); John G. Burgers, Oakville (CA); Ihab Edward Gerges, Oakville (CA); Kenneth M. A. Abels, Oakville (CA)

(73) Assignee: Dana Canada Corporation, Oakville, Ontario (CA)

( * ) Notice: Subject to any disclaimer, the term of this patent is extended or adjusted under 35 U.S.C. 154(b) by 881 days.

(21) Appl. No.: 14/191,551

(22) Filed: Feb. 27, 2014

(65) Prior Publication Data

US 2014/0246173 A1 Sep. 4, 2014

Related U.S. Application Data

(60) Provisional application No. 61/771,608, filed on Mar. 1, 2013.

(51) Int. Cl.
*F28F 27/02* (2006.01)
*F28D 9/00* (2006.01)
(Continued)

(52) U.S. Cl.
CPC ............. *F28F 27/02* (2013.01); *F01N 5/02* (2013.01); *F02M 26/26* (2016.02); *F02M 26/32* (2016.02);
(Continued)

(58) Field of Classification Search
CPC ....... F28F 27/02; B60K 13/04; F01N 2260/08
See application file for complete search history.

(56) References Cited

U.S. PATENT DOCUMENTS 1,810,286 A 6/1931 MacPhee
2,268,979 A 1/1942 Williamson
(Continued)

FOREIGN PATENT DOCUMENTS

CN 1623033 A 6/2005
CN 102164689 A 8/2011
(Continued)

OTHER PUBLICATIONS

U.S. Appl. No. 61/366,730, filed Jul. 22, 2010 (Sloss).
English Abstract of FR2755727 A1, published on May 15, 1998.

*Primary Examiner* — Ljiljana Ciric
*Assistant Examiner* — Alexis Cox
(74) *Attorney, Agent, or Firm* — Marshall & Melhorn, LLC

(57) ABSTRACT

A heat recovery device such as an EGHR device includes a bypass valve, a gas/liquid heat exchanger and a flow duct. The flow duct has an open top and an open bottom. A top surface of the duct seals to a surface surrounding an opening of a gas flow conduit, such as an exhaust pipe. A duct wall extends from the top surface to the bottom surface, to which the heat exchanger is secured. The flow duct provides a passage through gas flows between the gas flow conduit and the heat exchanger. The bypass valve is mounted in the flow duct and is movable between a bypass position and a heat exchange position. The bypass valve may be mounted adjacent to the top or bottom of the duct, and may be a butterfly-type valve, a one-sided flap valve, or a pair of one-sided flap valves.

24 Claims, 22 Drawing Sheets

(51) Int. Cl.
  *F28D 21/00* (2006.01)
  *F01N 5/02* (2006.01)
  *F02M 26/26* (2016.01)
  *F02M 26/32* (2016.01)

(52) U.S. Cl.
  CPC ............ *F28D 9/005* (2013.01); *F28D 9/0037* (2013.01); *F28D 9/0056* (2013.01); *F28D 21/0003* (2013.01); *F01N 2240/02* (2013.01); *F28F 2250/06* (2013.01); *Y02T 10/16* (2013.01)

(56) References Cited

U.S. PATENT DOCUMENTS

| | | | |
|---|---|---|---|
| 2,369,018 A * | 2/1945 | Cavicchioli | F16K 24/00 137/493.4 |
| 3,050,935 A | 8/1962 | Eastwood | |
| 3,095,113 A * | 6/1963 | Bodley | B65D 90/30 137/493.9 |
| 3,570,590 A | 3/1971 | Kofink | |
| 3,939,813 A | 2/1976 | Hurrow et al. | |
| 3,990,504 A * | 11/1976 | Kolthoff, Jr. | F28D 1/05341 123/41.08 |
| 4,391,235 A | 7/1983 | Majkrzak | |
| 4,471,803 A * | 9/1984 | Ollivier | F16K 17/20 137/462 |
| 4,593,749 A | 6/1986 | Schatz | |
| 4,685,430 A | 8/1987 | Ap | |
| 4,878,819 A * | 11/1989 | Bozoyan | E03D 5/01 4/431 |
| 6,141,961 A * | 11/2000 | Rinckel | F01N 3/043 60/274 |
| 6,155,042 A | 12/2000 | Perset et al. | |
| 6,164,553 A | 12/2000 | Derksen | |
| 6,244,256 B1 | 6/2001 | Wall et al. | |
| 6,250,380 B1 | 6/2001 | Strahle et al. | |
| 6,293,337 B1 | 9/2001 | Strahle et al. | |
| 6,349,858 B1 * | 2/2002 | Kingsford | B67D 7/0294 222/400.7 |
| 6,360,532 B2 | 3/2002 | Strahle et al. | |
| 6,920,918 B2 | 7/2005 | Knecht et al. | |
| 6,935,319 B2 | 8/2005 | Aupperle et al. | |
| 6,942,027 B2 | 9/2005 | Klotten et al. | |
| 6,955,213 B2 | 10/2005 | Stonehouse et al. | |
| 7,036,565 B2 | 5/2006 | Brost et al. | |
| 7,055,584 B2 | 6/2006 | Brost | |
| 7,056,173 B1 | 6/2006 | Shull et al. | |
| 7,077,114 B2 | 7/2006 | Husges | |
| 7,159,650 B2 | 1/2007 | Brost et al. | |
| 7,168,419 B2 | 1/2007 | Rosin et al. | |
| 7,243,707 B2 | 7/2007 | Brost et al. | |
| 7,380,544 B2 | 6/2008 | Raduenz et al. | |
| 7,581,533 B1 * | 9/2009 | Moran | F02M 26/26 123/568.12 |
| 7,631,688 B2 | 12/2009 | Brost et al. | |
| 7,703,506 B2 | 4/2010 | Brost et al. | |
| 7,723,062 B1 * | 5/2010 | O'Connor, Jr. | G01N 33/56911 435/7.1 |
| 7,743,816 B2 | 6/2010 | Mercz et al. | |
| 7,823,798 B2 | 11/2010 | Le Lievre | |
| 7,836,945 B2 | 11/2010 | Speer | |
| 7,958,874 B2 | 6/2011 | Kobayashi et al. | |
| 8,011,175 B2 | 9/2011 | Husges et al. | |
| 8,020,610 B2 | 9/2011 | Soldner et al. | |
| 8,033,323 B2 | 10/2011 | Schatz et al. | |
| 8,079,410 B2 | 12/2011 | Kim | |
| 8,146,344 B2 | 4/2012 | Harada | |
| 2003/0192606 A1 | 10/2003 | Heckt | |
| 2004/0182440 A1 | 9/2004 | Watts et al. | |
| 2004/0251012 A1 * | 12/2004 | Bush | B60H 1/18 165/81 |
| 2005/0039729 A1 | 2/2005 | Rosin et al. | |
| 2005/0178988 A1 * | 8/2005 | Biehl | F16K 31/002 251/11 |
| 2005/0199381 A1 | 9/2005 | Mercz et al. | |
| 2008/0115487 A1 | 5/2008 | Harada et al. | |
| 2008/0184974 A1 * | 8/2008 | Kobayashi | F02M 26/26 123/568.12 |
| 2008/0223563 A1 | 9/2008 | Penny et al. | |
| 2009/0038302 A1 | 2/2009 | Yamada et al. | |
| 2009/0044525 A1 | 2/2009 | Husges et al. | |
| 2009/0049832 A1 | 2/2009 | Huse | |
| 2009/0056909 A1 | 3/2009 | Braun | |
| 2009/0090486 A1 | 4/2009 | Geskes et al. | |
| 2009/0229812 A1 * | 9/2009 | Pineo | F01M 5/00 165/297 |
| 2009/0235654 A1 * | 9/2009 | Kobayashi | F02M 26/32 60/324 |
| 2009/0277165 A1 | 11/2009 | Geskes et al. | |
| 2010/0089043 A1 | 4/2010 | Dittmann et al. | |
| 2010/0107637 A1 | 5/2010 | Schoell | |
| 2010/0146954 A1 | 6/2010 | Sloss et al. | |
| 2011/0088378 A1 | 4/2011 | Prior et al. | |
| 2011/0088671 A1 | 4/2011 | Johnson | |
| 2011/0088672 A1 | 4/2011 | Prior et al. | |
| 2011/0099989 A1 | 5/2011 | Prior et al. | |
| 2011/0239634 A1 | 10/2011 | Reynolds | |
| 2012/0017575 A1 | 1/2012 | Sloss | |
| 2012/0067545 A1 | 3/2012 | Yamazaki et al. | |
| 2012/0102934 A1 | 5/2012 | Magnetto | |
| 2012/0102952 A1 | 5/2012 | Spohn et al. | |
| 2012/0132413 A1 * | 5/2012 | Cheadle | F01M 5/00 165/297 |
| 2012/0151999 A1 | 6/2012 | Seybold et al. | |
| 2012/0152487 A1 | 6/2012 | Styles et al. | |
| 2013/0061584 A1 * | 3/2013 | Gerges | F01N 5/02 60/320 |
| 2013/0126161 A1 * | 5/2013 | Rule | C09K 8/62 166/280.2 |
| 2014/0238641 A1 * | 8/2014 | Gerges | F02M 26/32 165/76 |
| 2014/0251579 A1 * | 9/2014 | Sloss | F01N 5/02 165/96 |
| 2015/0090917 A1 * | 4/2015 | Buck | E21B 34/14 251/315.1 |

FOREIGN PATENT DOCUMENTS

| | | |
|---|---|---|
| CN | 102203383 A | 9/2011 |
| EP | 0913561 A2 | 5/1999 |
| EP | 1291509 | 12/2003 |
| EP | 1431527 | 6/2004 |
| EP | 1475532 A2 | 11/2004 |
| EP | 1739298 A2 | 1/2007 |
| EP | 1748179 | 1/2007 |
| EP | 2381083 A1 | 10/2011 |
| FR | 2755727 A1 | 5/1998 |
| FR | 2859238 A1 | 3/2005 |
| FR | 2859239 A1 | 3/2005 |
| FR | 2859238 B1 | 1/2006 |
| FR | 2859239 B1 | 1/2006 |
| FR | 2924162 A1 | 5/2009 |
| FR | 2966873 A1 | 5/2012 |
| GB | 192489 | 2/1923 |
| GB | 1300948 | 12/1972 |
| GB | 1473153 | 5/1977 |
| GB | 2420593 | 5/2006 |
| GB | 2441588 | 12/2008 |
| GB | 2463482 A | 3/2010 |
| JP | 7-269332 | 10/1995 |
| JP | 2008215336 | 9/2008 |
| JP | 2009091918 | 4/2009 |
| JP | 2009191630 | 8/2009 |
| JP | 2009257208 | 11/2009 |
| JP | 2012026296 | 2/2012 |
| JP | 2012031929 | 2/2012 |
| WO | WO 00/28203 A1 | 5/2000 |
| WO | WO 01/50047 A1 | 7/2001 |
| WO | WO 03/001114 A1 | 1/2003 |
| WO | WO 2004/097192 | 11/2004 |
| WO | WO 2006/086054 A1 | 8/2006 |
| WO | WO 2011/132035 A1 | 10/2011 |

(56) References Cited

FOREIGN PATENT DOCUMENTS

| WO | 2012010960 A1 | 1/2012 |
| WO | WO 2012/010960 A1 | 1/2012 |
| WO | WO 2012/056179 A2 | 5/2012 |
| WO | 2013033839 A1 | 3/2013 |
| WO | WO 2013/033839 A1 | 3/2013 |

* cited by examiner

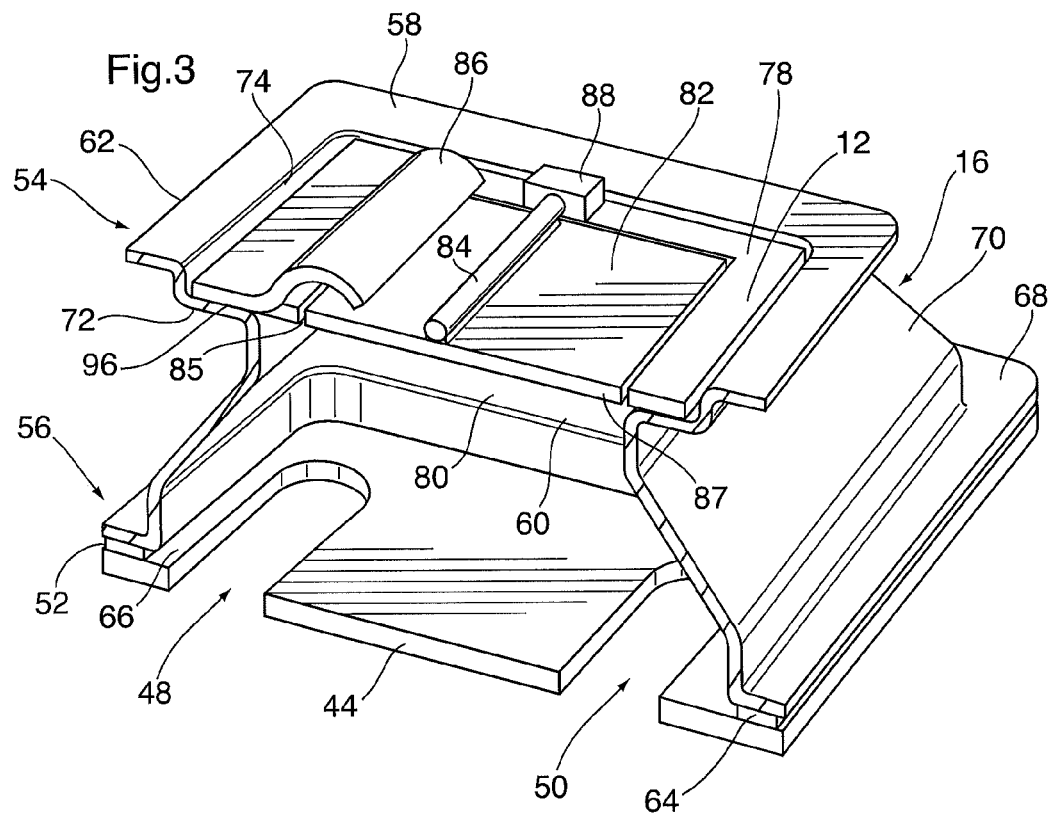

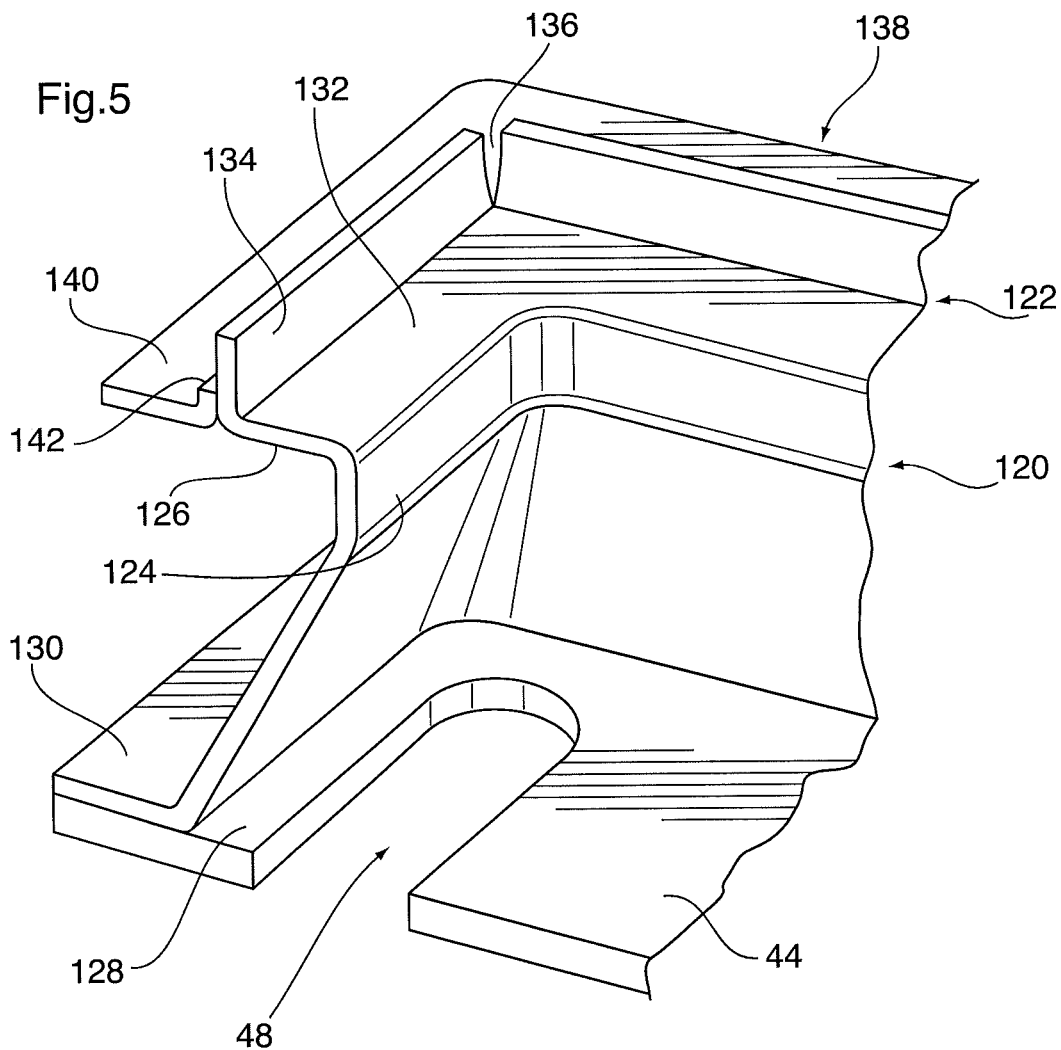
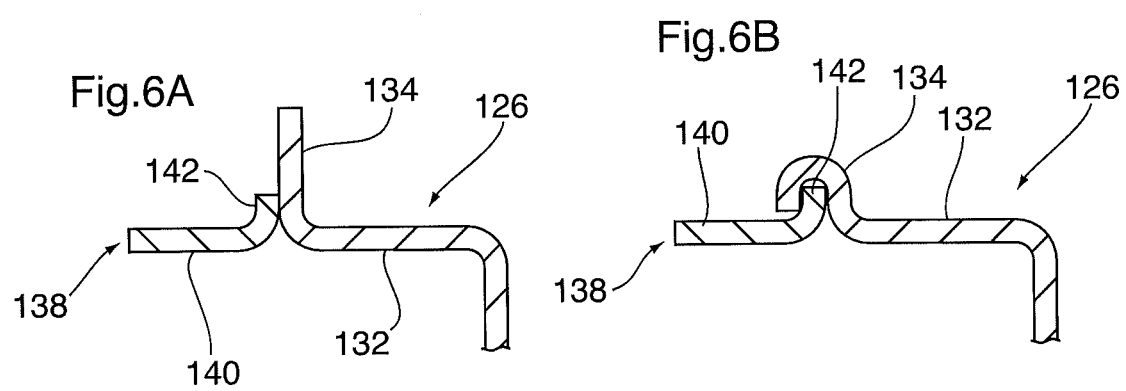

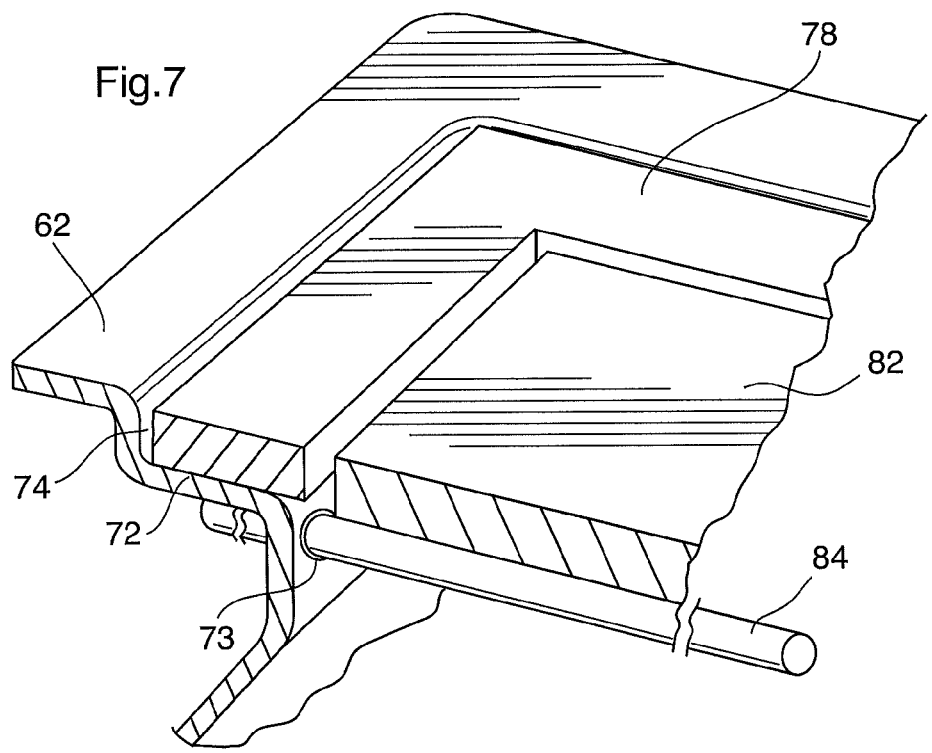
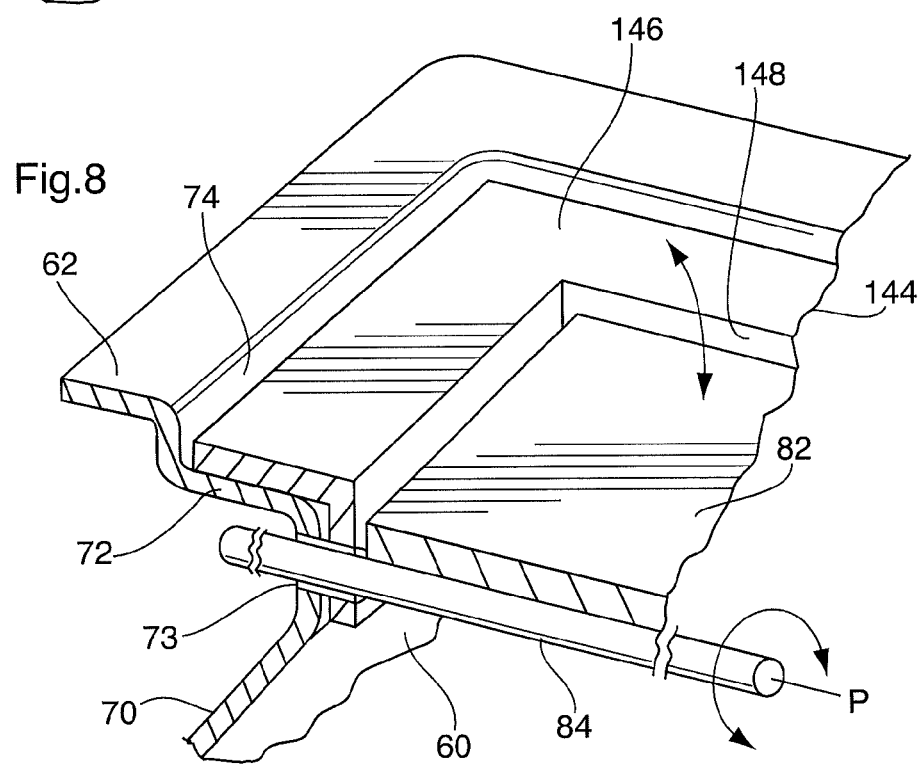

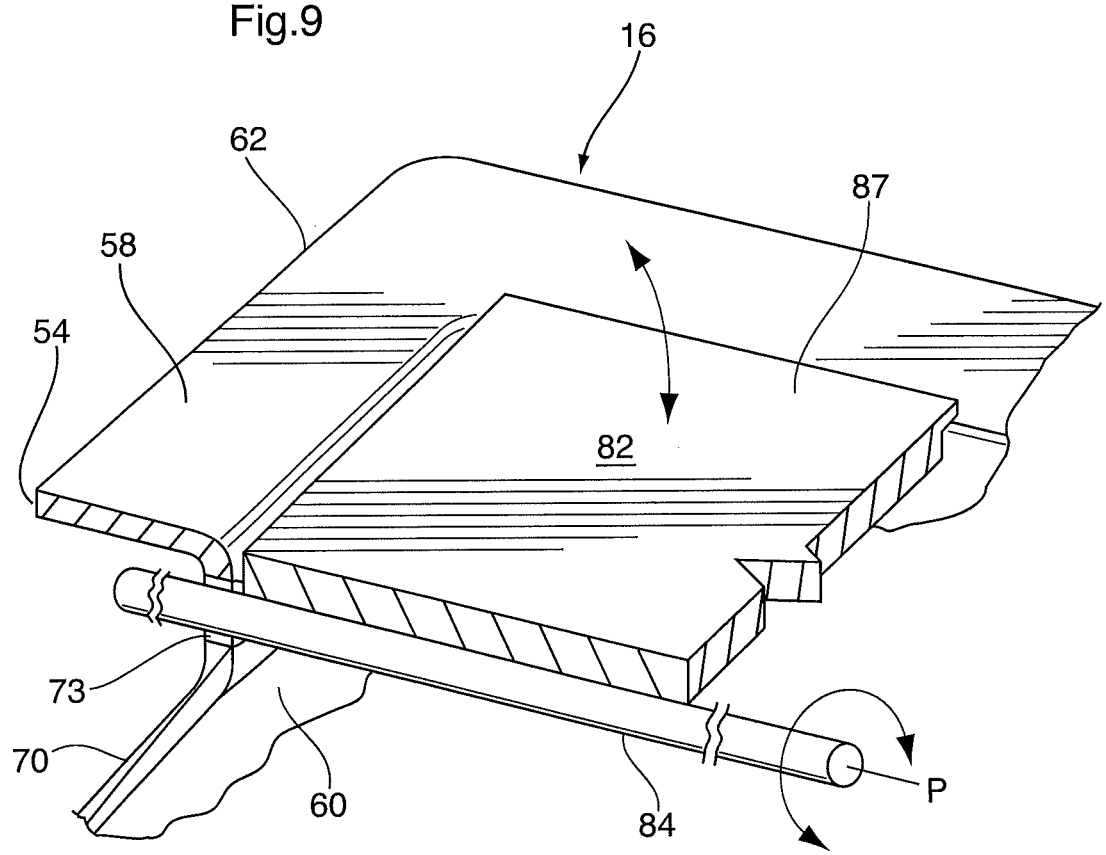

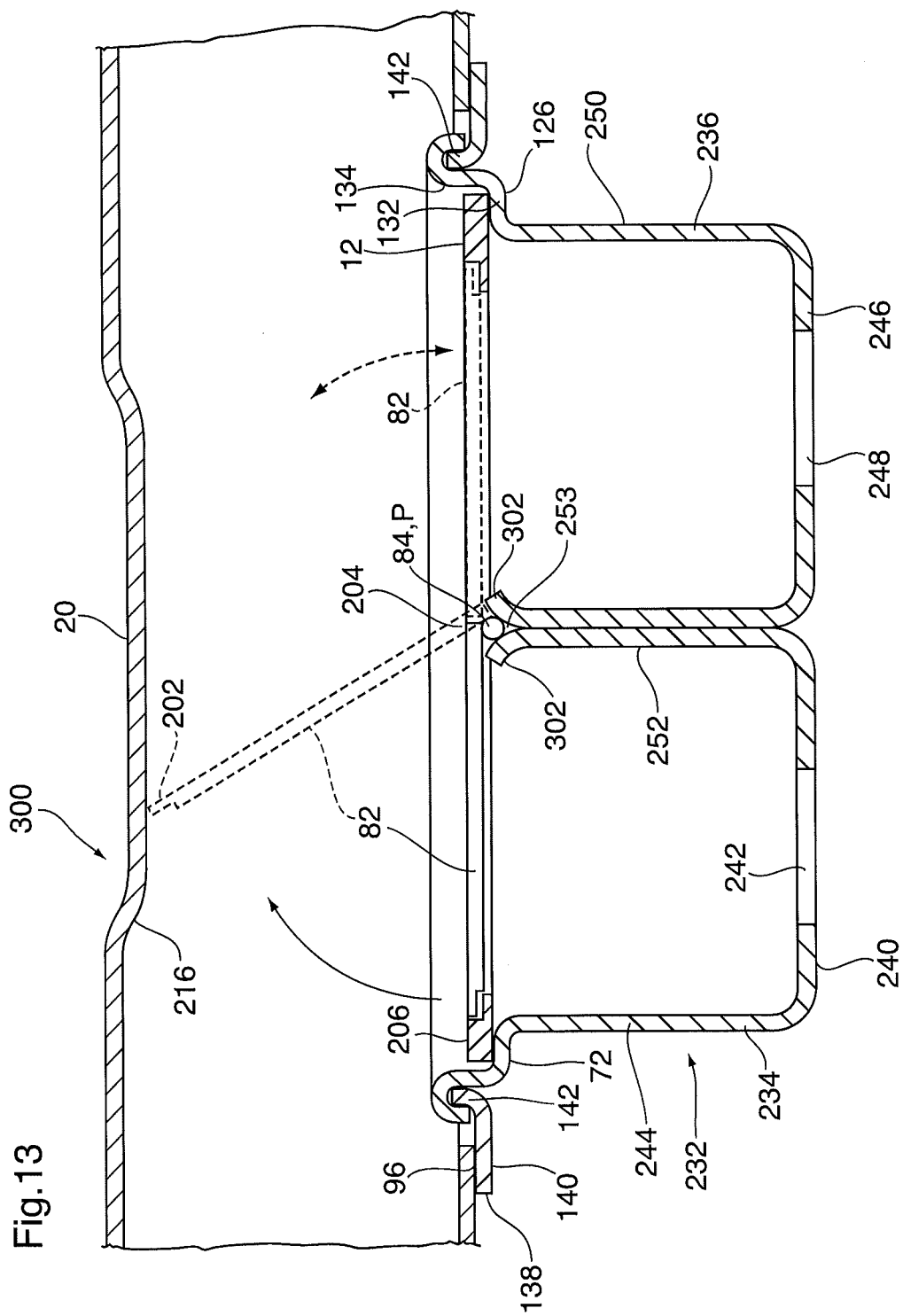

HEAT RECOVERY DEVICE WITH IMPROVED LIGHTWEIGHT FLOW COUPLING CHAMBER AND INSERTABLE VALVE

CROSS-REFERENCE TO RELATED APPLICATION

This application claims priority to and the benefit of U.S. Provisional Patent Application No. 61/771,608 filed Mar. 1, 2013, the contents of which are incorporated herein by reference.

FIELD OF THE INVENTION

The invention relates to devices for removing heat from gas streams, such as heat recovery devices for removing heat from motor vehicle intake and exhaust gas systems.

BACKGROUND OF THE INVENTION

The need to remove heat from gas streams arises in numerous applications. In motor vehicles, for instance, it may be necessary to remove heat from the intake and/or exhaust gas streams. For example, intake air (or "charge air") requires cooling in some applications, for example in turbocharged or supercharged engines. In vehicles incorporating exhaust gas recirculation (EGR) or exhaust gas heat recovery (EGHR) systems, heat is removed from the exhaust gas stream. The heat removed from the intake or exhaust gas stream is typically transferred to a liquid coolant in a heat exchanger.

In EGHR systems, for example, heat from vehicle exhaust gases is transferred to other vehicle components via a liquid coolant or oil in order to provide faster heating of air and vehicle fluids on start-up of the vehicle, thereby reducing fuel consumption. Heat extracted from the exhaust and used to heat up vehicle fluids such as engine oil and transmission fluid makes them less viscous and improves fuel economy during start-up. Also, heat extracted from the exhaust gases can be used for rapid heating of the passenger compartment and for window defrosting, reducing the need for long idling periods during start-up in cold weather. After the initial start-up period the recovery of heat from the exhaust gases is no longer required. Therefore, EGHR systems typically include a bypass to minimize heat transfer from the exhaust gases to the liquid coolant once the vehicle reaches normal operating temperature. This helps to minimize the load on the cooling system and minimizes the risk of boiling or thermal degradation of the liquid coolant.

An EGHR system therefore incorporates a gas to liquid heat exchanger for extracting heat from the vehicle exhaust gas and transferring the heat to a liquid coolant, typically a water/glycol engine coolant, although direct heat transfer to an oil is also possible. The EGHR system also includes a diverter valve for directing at least a portion of the exhaust gas flow through the heat exchanger during vehicle start-up, and for bypassing the heat exchanger once the heat from the exhaust gas is no longer required. The heat exchanger and the valve need to be connected to the exhaust gas system piping. An actuator is also provided in order to control operation of the valve. The valve may be operated by means of an electronically controlled solenoid, a wax motor, engine vacuum or a bimetal or shape memory alloy (SMA) actuator.

To save space and to reduce cost and vehicle weight, the valve and heat exchanger may be integrated into a single unit, referred to herein as an EGHR device. In many integrated EGHR devices, however, the heat exchanger is heated by the exhaust gases whether the device is in heat exchange mode or bypass mode. This may be due to exhaust gas leakage past the valve and/or thermal conduction. This increases the amount of heat transferred to the coolant, increasing the load on the cooling system, and risking cumulative thermal degradation of the coolant or induced thermal stresses which can cause damage to the heat exchanger.

There remains a need for simple and effective heat recovery devices for motor vehicle intake and exhaust gas systems which minimize usage of space, weight, and number of components, which are readily integratable into existing exhaust system piping, and which also minimize thermal stresses and unwanted heat transfer to the coolant in bypass mode.

SUMMARY OF THE INVENTION

According to an embodiment, there is provided a heat recovery device comprising a gas diverter valve, a gas/liquid heat exchanger and a flow duct. The gas diverter valve comprises a valve member movable between a bypass position and a heat exchange position. The gas/liquid heat exchanger comprises a plurality of gas flow passages, a gas inlet manifold and a gas outlet manifold in flow communication with the gas flow passages. The flow duct comprises: (a) a top sealing surface adapted to seal to a sealing surface of a gas flow conduit, the top sealing surface surrounding a top opening in the flow duct; and (b) a duct wall extending between the heat exchanger and the top sealing surface and enclosing an interior of the flow duct, wherein the interior of the flow duct is in flow communication with the gas flow passages of the heat exchanger.

According to an embodiment, there is provided a combination of a heat recovery device and a gas flow conduit. The heat recovery device comprises a gas diverter valve, a gas/liquid heat exchanger and a flow duct. The gas diverter valve comprises a valve member movable between a bypass position and a heat exchange position. The gas/liquid heat exchanger comprises a plurality of gas flow passages, a gas inlet manifold and a gas outlet manifold in flow communication with said gas flow passages. The flow duct comprises: (a) a top sealing surface sealed to a sealing surface of the gas flow conduit, the top sealing surface surrounding a top opening in the flow duct; and (b) a duct wall extending between the heat exchanger and the top sealing surface and enclosing an interior of the flow duct, wherein the interior of the flow duct is in flow communication with the gas flow passages of the heat exchanger.

According to an embodiment, there is provided a heat recovery device, comprising: (a) a gas/liquid heat exchanger comprising a plurality of gas flow passages, a gas inlet manifold, and a gas outlet manifold in flow communication with said gas flow passages; (b) a gas flow duct comprising: (i) a hollow interior chamber; (ii) a first open end and a second open end spaced apart from one another along a bypass gas flow direction, wherein a bypass gas flow passage is defined through the hollow interior chamber between the first and second ends, along said bypass gas flow direction; and (iii) at least one opening through which flow communication is provided between the interior chamber and the gas inlet and outlet manifolds of the heat exchanger, wherein said at least one opening is located between the first and second ends of the gas flow duct; (c) a gas diverter valve comprising a first valve member and a second valve member, both of which are located within the hollow interior chamber of the gas flow duct, wherein each of the first and second valve members is pivotable about a pivot axis between a closed position in which flow communication between the hollow interior chamber and one of the manifolds of the heat exchanger is substantially prevented by the valve member, and an open position in which flow communication between the hollow interior chamber and one of the manifolds of the heat exchanger is permitted. With both of the valve members in the closed position, the valve members substantially block said at least one opening so as to substantially prevent flow communication between the hollow interior chamber and the gas inlet and outlet manifolds of the heat exchanger.

BRIEF DESCRIPTION OF THE DRAWINGS

The invention will now be described, by way of example only, with reference to the accompanying drawings, in which:

FIG. 3 is a perspective, cross-sectional view showing a portion of the heat recovery device of FIG. 1;

FIG. 4 is a longitudinal cross-section of a heat recovery device according to a second embodiment of the invention;

FIG. 5 is a cross-sectional perspective view of a heat recovery device according to a further embodiment of the invention, with the gas flow duct shown in isolation;

FIGS. 6A and 6B are enlarged views showing a portion of the gas flow duct of FIG. 5;

FIGS. 7-9 are close-up views showing alternate means for mounting the valve of a heat recovery device according to various embodiments of the invention;

FIG. 13 is a longitudinal cross-section of a heat recovery device according to a further embodiment of the invention;

DETAILED DESCRIPTION

Figure 1:
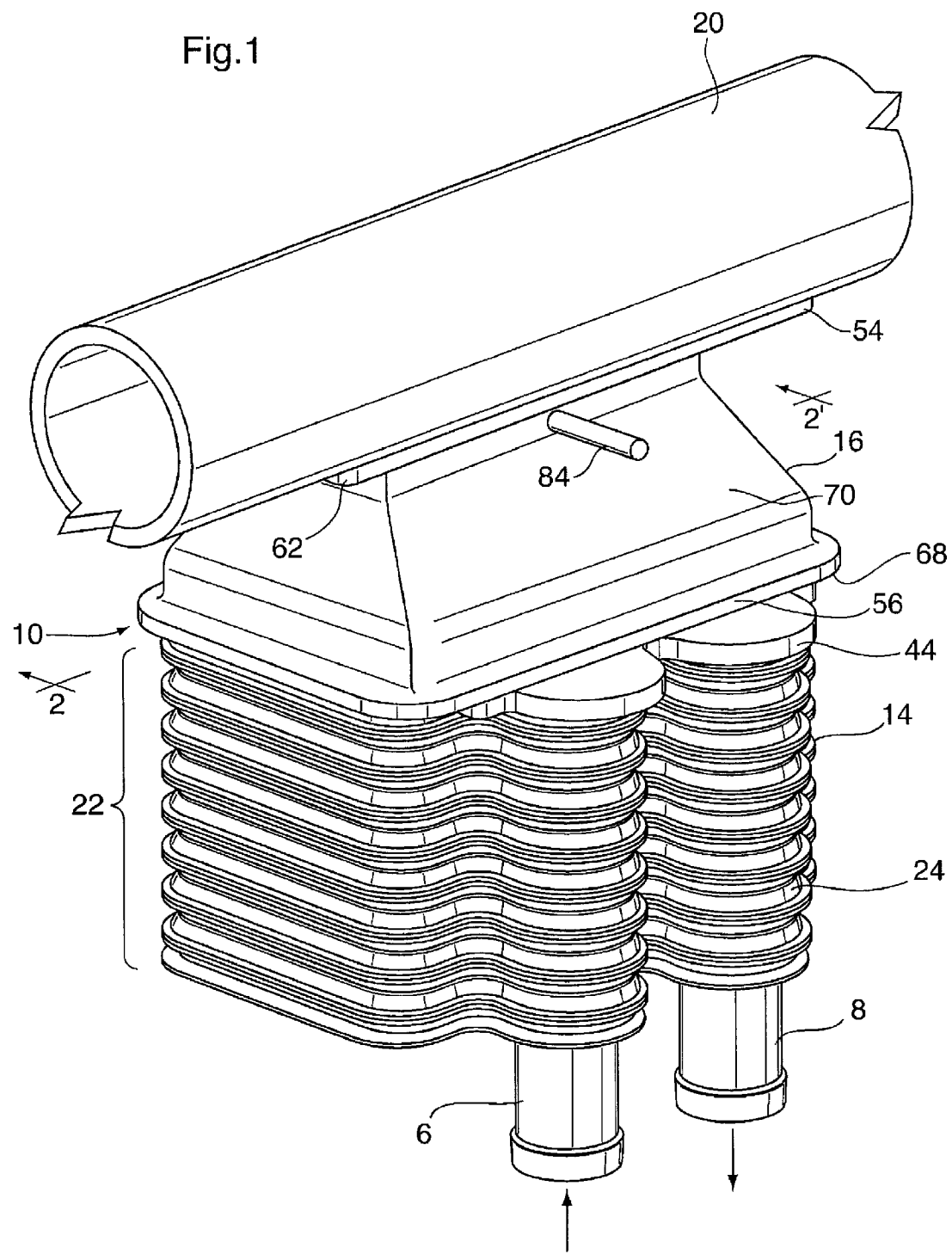
FIG. 1 is a perspective view of heat recovery device according to a first embodiment of the invention joined to an exhaust gas conduit.

A heat recovery device 10 according to a first embodiment of the invention is now described with reference to FIGS. 1-3. The heat recovery device 10 may be used as an EGHR device in a motor vehicle exhaust system, and is therefore sometimes referred to herein as EGHR device 10.

The device 10 comprises a gas diverter valve 12, a gas/liquid heat exchanger 14 and an exhaust gas inlet/outlet coupling, or flow duct 16. The heat recovery device 10 is shown in FIGS. 1 and 2 as being attached to a hot gas conduit 20, for example, a section of an exhaust pipe of a motor vehicle, located downstream of the exhaust manifold and upstream of the tail pipe.

The heat exchanger 14 may be similar or identical to the heat exchanger described in commonly assigned U.S. patent application Ser. No. 13/599,339 for an invention entitled "Exhaust Gas Heat Recovery Device", filed on Aug. 30, 2012.

The heat exchanger 14 comprises a heat exchanger core 22 including a stack of core plates 24 defining a plurality of gas flow passages 26 and a plurality of liquid flow passages 28 arranged in alternating order. The gas flow passages 26 and the liquid flow passages 28 may be parallel to the flow of gas through the gas conduit 20. Typically, the gas flowing through the gas flow passages 26 is a hot vehicle exhaust gas, and the liquid flowing through the liquid flow passages 28 is a liquid coolant, such as a water/glycol engine coolant which may also circulate through other components of the vehicle's cooling system. Typically the core plates 24 making up the heat exchanger 14 will comprise stainless steel or other heat resisting material, and will typically be joined by brazing with a suitable filler metal.

A plurality of manifolds extend through the core 22, and may be substantially perpendicular to the direction of gas flow through conduit 20. The heat exchanger 14 includes four such manifolds, namely a gas inlet manifold 30 and a gas outlet manifold 32 in flow communication with the gas flow passages 26; and a liquid inlet manifold 34 and a liquid outlet manifold 36 in flow communication with the liquid flow passages 28. The liquid manifolds 34, 36 are in flow communication with a pair of liquid fittings 6, 8.

The heat exchanger core 22 has a bottom plate 38 which is provided with a gas inlet manifold opening 40 and a gas outlet manifold opening 42.

Figure 2:
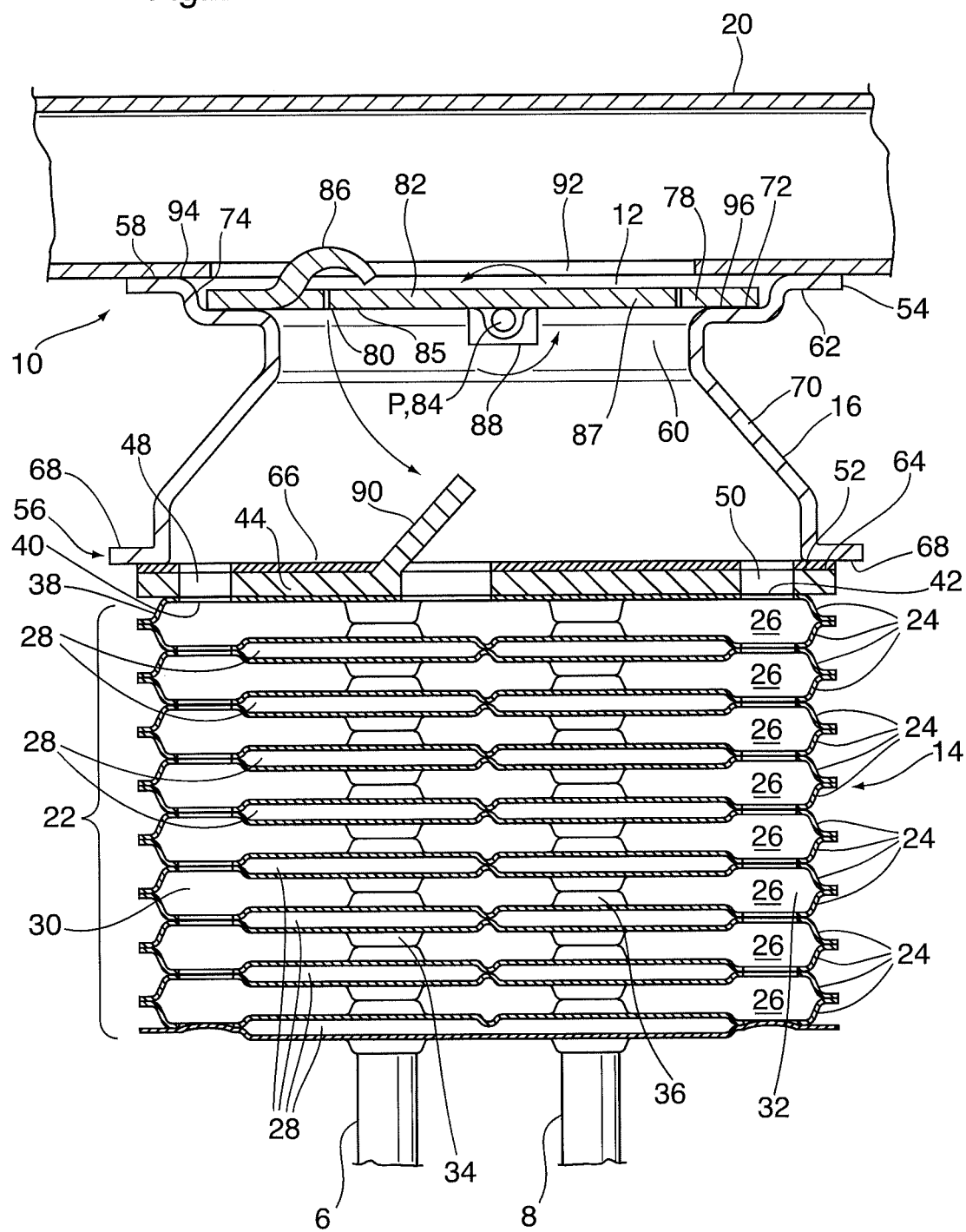
FIG. 2 is a longitudinal cross-section along line 2-2' of FIG. 1 in bypass mode.

In the embodiment illustrated in FIGS. 1-3, a mounting plate 44 is provided between the bottom plate 38 and the flow duct 16. The mounting plate 44 may be secured to the bottom plate 38 by any convenient means, such as by welding, brazing or by means of mechanical fasteners. In the first embodiment, the mounting plate 44 is brazed to the bottom plate 38 of heat exchanger 14 and is secured to the flow duct 16 by means of mechanical fasteners such as bolts, for which purpose the peripheral edges of the mounting plate 44 may be provided with bolt holes (not shown). This arrangement may be advantageous where, for example, the flow duct 16 and the heat exchanger 14 are made of dissimilar metals which are difficult to braze or weld together.

The mounting plate 44 is also provided with a gas inlet manifold opening 48 and a gas outlet manifold opening 50, the openings 48, 50 being spaced apart from one another in the direction of flow through the gas conduit 20. The openings 48, 50 are aligned with the respective gas inlet manifold 30 and gas outlet manifold 32 of the core 22 so as to provide communication between the interior of the flow duct 16 and the gas inlet and outlet manifolds 30, 32 of heat exchanger 14.

Between the mounting plate 44 and the flow duct 16 there may be provided a layer of thermally insulating material so as to reduce conduction of heat from the flow duct 16 to the heat exchanger 14. This thermally insulating layer may take the form of a gasket 52 provided between the mounting plate 44 and the flow duct 16.

The flow duct 16 may be fabricated from sheet metal which may have the same or different composition from the metal comprising heat exchanger 14. Selection of the duct material to be thin gauge will minimize conductive heat transfer from the hot exhaust gas to the heat exchanger 14, when in the heat exchanger bypass mode, facilitate duct fabrication, and minimize weight. The flow duct 16 has a top 54 and a bottom 56, both of which are provided with sealing surfaces. Firstly, the top 54 of duct 16 is provided with a conduit sealing surface 58 (also referred to herein as the "top sealing surface") along which the duct 16 is secured to the gas conduit 20. The conduit sealing surface 58 surrounds a top opening 60 in the duct 16 through which flow communication is provided between the interior of duct 16 and the interior of the gas conduit 20. In the illustrated embodiment, the conduit sealing surface 58 is planar and comprises a top sealing flange 62 surrounding the top opening 60.

The gas conduit 20 is provided with an opening 92 of similar shape and size as the top opening 60 of duct 16. In the embodiment illustrated in FIG. 2, the opening 92 of gas conduit 20 is slightly longer than opening 60. The opening 92 of conduit 20 is surrounded by a sealing surface 94 along which the conduit 20 is secured to the duct 16, for example by welding, brazing or by means of mechanical fasteners. The sealing surface 94 surrounding opening 92 is of similar size and shape as the top sealing flange 62, and is aligned with top sealing flange 62, so that a sealed, fluid-tight connection may be formed between the conduit 20 and the top 54 of duct 16.

The bottom 56 of duct 16 has a heat exchanger sealing surface 64 (also referred to herein as the "bottom sealing surface") along which the duct 16 is secured to the mounting plate 44 or directly to the bottom plate 38 of heat exchanger 14 where no mounting plate 44 is provided. The heat exchanger sealing surface 64 surrounds a bottom opening 66 in the duct 16 through which flow communication is provided between the interior of duct 16 and the heat exchanger 14. In the illustrated embodiment, the heat exchanger sealing surface 64 is planar and comprises a bottom sealing flange 68 surrounding the bottom opening 66.

Thus, it can be seen that flow communication between the interior of conduit 20 and the gas flow passages of heat exchanger 14 is provided through duct 16.

In between the sealing flanges 62, 68, the flow duct 16 comprises a duct wall 70 which is shaped to promote gas flow distribution to the heat exchanger manifolds. In the illustrated embodiment, the top opening 60 is smaller than the bottom opening 66, and therefore the duct wall 70 may slope outwardly from the top sealing flange 62 to the bottom sealing flange 68. This configuration is due primarily to the heat exchanger 14 being somewhat wider than the diameter of the gas conduit 20. Also, due at least in part to the rectangular shape of the heat exchanger plates, the top and bottom sealing flanges 62, 68 and the duct wall 70 each have four sides, and have a generally rectangular profile when viewed in the plane of top sealing flange 62. Optionally however, the upper part of the duct 16 could be oval shaped in plan, such that the top sealing flange 62 of duct 16 may also be oval in plan.

In the embodiment illustrated in FIGS. 1-3, the flow duct 16 also includes a nesting surface 72 which supports the valve 12 as further described below. The nesting surface 72 surrounds the edge of the top opening 60, and comprises a flat, planar surface located inwardly of the top sealing flange 62 and separated therefrom by a vertical shoulder 74. In the illustrated embodiment, the nesting surface 72 has a rectangular shape.

The gas diverter valve 12 comprises an insertable valve member comprising a flat, planar support frame 78 which sits on top of the nesting surface 72 and which may be attached thereto by brazing or welding. Therefore, the support frame 78 has a lower sealing surface 96 which is sized and shaped to align with and seal to the nesting surface 72. In the illustrated embodiment, the support frame 78 is rectangular. The support frame 78 defines a valve opening 80 in which is received a valve member 82 which is pivotable between a bypass position shown in FIG. 3 and a heat exchange position shown in FIG. 2.

In the bypass position, the valve 12 is closed, with the valve member 82 substantially completely blocking the valve opening 80. Conversely, in the heat exchange position, the valve 12 is open and the valve member 82 is pivoted out of its blocking position relative to valve opening 80.

As shown in the drawings, valve member 82 comprises a flapper which pivots about a pivot axis P extending through the flow duct at an angle of about 90 degrees to the direction of gas flow through the conduit 20. The valve member 82 may be mounted on a rod 84, and is rotated on rod 84 between the closed heat exchange position and the open bypass position. In FIGS. 1-3, the valve 12 is a "butterfly" type valve, in which the rod 84 is located about midway between the leading edge 85 and the trailing edge 87 of valve member 82.

The rotation of valve member 82 about axis P may be controlled by any suitable means, including an electronic solenoid or an actuator driven by engine vacuum, or other suitable actuator or control system. The valve member 82 and the valve opening 80 may be of any suitable shape, including square or rectangular as shown in FIGS. 1-3, or circular, oval, or of irregular shape, to seal with the inner surface of the gas conduit 20 in the heat exchange position. It will be appreciated that the shape of valve member 82 depends somewhat on the shape of the flow duct 16 and the gas conduit. For example, where the gas conduit 20 has a rounded inner surface, the end of the valve member 82 which rotates up into the conduit 20 (this may be the leading end or trailing end depending on the direction of rotation) will have a matching rounded shape, such as circular, oval, elliptical etc., to seal against the inner surface of the gas conduit 20 in the heat exchange position. The opposite end of the valve member 82, which seals against the bottom plate 38 or mounting plate 44 in the heat exchange position, may be square or rectangular. Also, since the lower end of the valve member 82 needs to serve as a bypass blocker (between the inlet and outlet flow paths to the heat exchanger 14), it will be appreciated that wall 70 of flow duct 16 may need to protrude inwards, or be fitted with wall extensions, to closely mate with the edges of the valve member 82 in the valve width direction, when the valve member 82 is in its open heat exchange position. This is further discussed below with reference to FIG. 14B.

With the valve member 82 in the bypass position illustrated in FIG. 3, flow communication between the gas conduit 20 and the heat exchanger 14 is substantially completely blocked, while the bypass gas flow path through the gas conduit 20 is substantially completely open. Therefore, with the valve member 82 in the bypass position, substantially all the exhaust gas flows through the bypass gas flow path defined by gas conduit 20, and there will be little or no flow of gas to the heat exchanger 14. Because the heat exchanger 14 is isolated from the flow of hot gas through conduit 20 with valve 12 in the bypass position, the heat exchanger 14 is thermally isolated from the gas flow, and therefore undesirable heat transfer from the hot gas to the coolant is minimized with the valve 12 in the bypass position.

Conversely, with the valve member 82 in the heat exchange position shown in FIG. 2, the gas conduit 20 is substantially completely blocked by valve member 82 while flow communication is permitted between the gas conduit 20 and heat exchanger 14. In particular, with the valve member 82 in the heat exchange position, the valve member substantially completely blocks the gas conduit 20 at a position which is in between the gas inlet manifold 30 and the gas outlet manifold 32 of the heat exchanger. Therefore, substantially all the gas flowing through conduit 20 is forced to enter the gas inlet manifold 30, flow through the gas flow passages 26 of heat exchanger 14 and exit the heat exchanger 14 through the gas outlet manifold 32.

Therefore, the flow duct 16 not only provides a duct space to transition the flow of gas from conduit 20 into and out of the heat exchanger 14, but also provides a thermal buffer (or thermal break) space between the hot gas flowing through conduit 20 and the relatively cool heat exchanger 14 in the bypass mode.

To promote good fluid flow, a contoured flow vane 86 provides a rounded inlet surface along which the gases from conduit 20 flow into the heat exchanger 14 when the valve member 82 is in the heat exchange position. The contoured flow vane 86 promotes good fluid flow and minimizes pressure drop through the heat recovery device 10. The vane 86 also provides a surface which the leading edge 85 of valve member 82 may engage with the valve 12 in the bypass position. Although flow vane 86 is located proximate to the leading edge of valve member 82, it will be appreciated that it is possible to locate the flow vane 86 proximate to the trailing edge of valve member 82.

Since it is difficult to ensure a perfect seal, the inventors have found it useful to ensure that a venturi effect is provided in the exhaust conduit 20, in the region of flow duct 16. This is further discussed below in the context of other embodiments of the invention. Therefore, with the valve 12 in the closed, bypass position, the venturi "sucks" any stray gas that does enter the inlet side of flow duct 16, out through the exhaust side of flow duct 16, before the gas comes into contact with the heat exchanger 14. With the valve 12 in the open, heat exchange position, the venturi creates a pressure differential across the inlet and outlet portions of the flow duct 16, thus inducing full gas flow through the heat exchanger 14 when full heat transfer is wanted.

Also shown in FIGS. 2 and 3 is a bushing or "bearing block" 88 into or which an end of the valve rod 84 extends and which may house valve bearings (not shown). Typically one end of the valve rod will be received in a bushing 88 which may be located within the flow duct 16, and an opposite end of the valve rod 84 will typically penetrate the duct wall 70 as shown in FIG. 1. Although not shown in FIG. 1, it will be appreciated that the end of valve rod 84 which penetrates duct wall 70 will extend through a bushing or bearing block 88 mounting either inside or outside the duct wall 70. Also, the penetrating end of valve rod 84 will typically be attached to the valve actuation mechanism (not shown).

FIG. 3 shows the valve rod 84 being mounted to the top surface of valve member 82, with an end of rod 84 received in a bearing block 88 which is mounted to the interior surface of the duct wall 70. In contrast, the cross section of FIG. 2 shows the rod 84 and bearing block 88 mounted to the bottom, or underside of the valve member 82. The manner of mounting rod 84 to valve member 82 is variable, however mounting the rod 84 to the underside of valve member 82 may reduce the exposure of the valve rod 84 and the bearing block 88 to heat from the gases flowing through conduit 20.

In order to minimize bypass gas flow in the heat exchange mode, additional elements may be incorporated into the heat recovery device 10 in order to enhance sealing of the valve member 82 in the heat exchange position. In this regard, the mounting plate 44 may be provided with an upstanding flange or tab 90 which forms a lap seal with either the leading or trailing edge 85, 87 of valve member 82 in the heat exchange position. In the embodiment of FIGS. 1-3, the seal is with the leading edge 85 of valve member 82. The tab 90 also eliminates any effect that a variation in the thickness of gasket 52 may have on the seal between valve member 82 and mounting plate 44.

The tab 90 may comprise a flap of metal which is attached to the upper surface of mounting plate 44. Alternatively, the tab 90 may be integrally formed with the mounting plate 44 and is bent upwardly from the body of mounting plate 44, in which case it does not add to the weight of device 10 since it is comprised of material which is part of the mounting plate 44. The angle of the tab 90 is selected so as to lie flat against the surface of valve member 82 in the heat exchange mode, as shown in FIG. 2.

Where the valve member 82 is rectangular, as in FIGS. 1-3, the tab 90 may have a rectangular shape, with a long dimension extending along the full width of the leading edge 85 of valve member 82, and thereby facilitate the creation of a bypass block (perhaps in conjunction with duct wall extensions above the tab) when the valve 12 is in an open heat exchange position. As shown, the tab 90 may be angled by less than 90 degrees relative to the surface of mounting plate 44, and is angled away from a vertical axis in the direction of gas flow. This angling of the tab 90 reduces the stroke of the valve member 82 during opening and closing of the valve 12. In other words, the valve member 82 rotates by less than 90 degrees to seal against tab 90. To further reduce the stroke of the valve member 82, the tab 90 may be located toward the gas inlet manifold opening 48 of the mounting plate 44.

FIG. 4 illustrates a portion of a heat recovery device 100 according to a second embodiment of the invention, comprising a valve 12 and heat exchanger 14 as described above, and having a flow duct 102 which differs from duct 16 as described below.

The flow duct 102 includes a top opening 106 providing flow communication between the interior of duct 102 and the interior of gas conduit 20, and a bottom opening 108 providing flow communication between the interior of duct 102 and the heat exchanger 14 through the mounting plate 44. The duct 102 includes a smoothly contoured duct wall 110 extending between an outwardly extending bottom sealing flange 112 and an inwardly extending top sealing flange 114. It can be seen that the flanges 112 and 114 form smooth, continuous transitions with the duct wall 110. In addition, the provision of an inwardly extending top sealing flange 114 permits the top of duct 102 to have a simplified construction, eliminating the outwardly extending top flange 62, nesting surface 72 and vertical shoulder 74 of the duct 16 described above.

In the embodiment shown in FIG. 4, the support frame 78 surrounding valve opening 80 is received on top of the top sealing flange 114 and may be secured thereto by brazing or welding. Alternatively, as shown in FIG. 4, the connection between the valve support frame 78 and the top sealing flange 114 may be a mechanical connection which is sealed by a gasket 116. Also, as shown in this embodiment, the mounting plate and the bottom sealing flange 112 may be joined together by brazing or welding. The embodiment of FIG. 4 may be modified by entirely eliminating the support frame 78 and directly mounting the valve rod 84 and bearing block 88 to the underside of top sealing flange 114, while the top surface of flange 114 effectively serves as the valve support frame and is joined directly to the gas conduit 20.

FIGS. 5, 6A and 6B each illustrate a portion of a flow duct 122 of a heat recovery device 120 according to a third embodiment of the invention. The heat recovery device 120 comprises a valve 12 (not shown in FIG. 5) and heat exchanger 14 (of which only mounting plate 44 is shown) as described above, and has a flow duct 122 which differs from duct 16 as described below.

The flow duct 122 of FIG. 5 has a top opening 124 surrounded by an outwardly extending conduit sealing flange 126 and a bottom opening 128 surrounded by an outwardly extending heat exchanger sealing flange 130. As shown, the heat exchanger sealing flange 130 is connected to the mounting plate 44 of a heat exchanger 14 (not shown), for example by brazing, welding or by a mechanical connection.

The conduit sealing flange 126 includes a planar nesting ridge 132 surrounding the top opening 124 and an outer vertical flange 134 extending around the outer periphery of the nesting ridge 132 and integrally joined thereto. Where the nesting ridge 132 and vertical flange 134 are rectangular, as shown in FIG. 5, notches 136 may be provided at the corners of vertical flange 134 to allow it to be folded up from the nesting ridge 132 during manufacturing. As can be seen from FIG. 5, the vertical peripheral flange 134 is similar in appearance to vertical shoulder 74 of flow duct 16, and similarly functions to retain the support frame 78 of valve 12.

Surrounding the vertical peripheral flange 134 of duct 122 is a top sealing flange 138 through which the duct 122 is mounted to the gas conduit 20. The top sealing flange 138 may be L-shaped, having a planar, flat sealing portion 140 which is to be sealed to the conduit 20, and a vertical portion 142 through which the top sealing flange 138 may be attached to the vertical peripheral flange 134 surrounding the nesting ridge 132. The close-up views of FIGS. 6A and 6B show how the abutting vertical flanges 142 and 134 may be joined by crimping. As shown in FIG. 6B, the taller vertical flange 134 surrounding nesting ridge 132 may be folded over the shorter vertical flange 142 of the top sealing flange 138. Alternatively, the vertical flange 134 surrounding nesting ridge 132 may be shorter than vertical flange 142, in which case a crimped connection may be formed by folding the top of flange 142 over the shorter flange 134. As an alternative to crimping, the top sealing flange 138 may simply be welded or brazed to the vertical flange 134 surrounding nesting ridge 132. It will be appreciated that forming the top of flow duct 122 in this manner avoids the need for complex forming operations.

FIGS. 7-9 illustrate a number of alternative constructions for the top 54 of duct 16 and, in particular, for the incorporation of valve 12 into the top 54 of duct 16 and the penetration of an end of the valve rod 84 through the duct wall 70.

Firstly, FIG. 7 is a partial, close-up perspective view showing an arrangement similar to that of FIG. 2, in which the valve rod 84 is mounted to the underside of valve member 82. In this configuration, the valve rod 84 may be co-planar with the nesting surface 72, therefore requiring a small cut-out or ridge in the nesting surface 72 and/or the vertical shoulder 74 of duct 16 to allow the valve rod 84 to pass therethrough.

FIG. 8 illustrates a variation in which the valve member 82 is mounted below the plane of nesting surface 72 so that the valve rod 84 extends through a vertical portion of the duct wall 70. In this embodiment, the valve 12 includes a valve member 82 supported within the valve opening 80 of a modified support frame 144 having an L-shaped construction. The modified support frame 144 includes a horizontal leg 146 which is received on top of and sealed to the nesting surface 72, and a vertical leg 148 extending downwardly from the inner edge of the horizontal leg 146 into the top opening 60 of duct 16. As shown, the valve rod 84, which is mounted to the underside of valve member 82, extends through the vertical leg 148 of the valve flange 144 and through a vertical portion of the duct wall 70. In this embodiment, the vertical leg 148 may serve as an axle bushing, with the opposite (i.e. non-penetrating) end of the axle rod 84 received in an aperture in vertical leg 148.

FIG. 9 shows yet another alternate construction in which the valve member 82 is directly mounted in the top opening 60, without a surrounding support frame 78. Therefore, this embodiment eliminates the need for a nesting surface 72, and the top 54 of the flow duct 16 is simply provided with an outwardly extending conduit sealing flange 58 at the top 54 of the duct 16. With the valve member 82 directly mounted in the top opening 60, and with the rod 84 mounted to the underside of valve member 82, it can be seen that the elimination of the nesting surface 72 in this embodiment permits the rod 84 to pass through a vertical surface of the duct wall 70. As also shown in FIG. 9, the trailing edge 87 of valve member 82 may overlap the edge of sealing flange 58 to provide enhanced sealing. To provide enhanced sealing, the underside of the valve member 82 at trailing edge 87 may be notched as shown in FIG. 9. Another advantage of this arrangement is that it permits the location of rod 84 to be dropped down, further away from the hot exhaust gas stream, provided that the tilt angle of the valve member 82 is allowed to increase to accommodate this, and provided that the lengths of the leading and trailing ends of the valve member 82 can be adjusted to accommodate the lowering of rod 84.

It will be appreciated that the penetration of valve rod 84 through the duct wall 70 must be sealed. FIGS. 7-9 show a seal 73 in the form of a sleeve or bushing which closely receives the rod 84.

Figure 10:
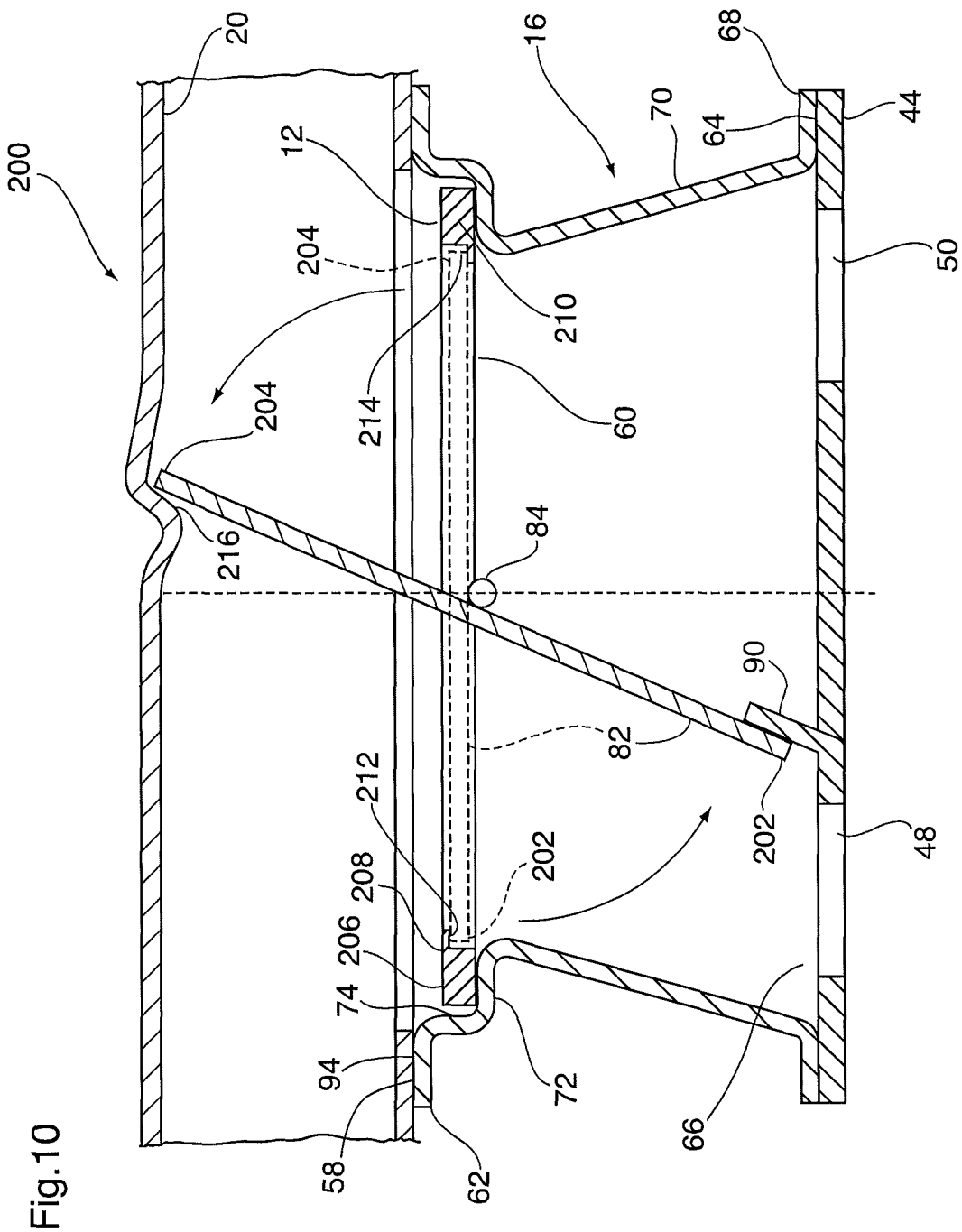
FIG. 10 is a longitudinal cross-section of a heat recovery device according to a further embodiment of the invention.

FIG. 10 illustrates a heat recovery device 200 according to a further embodiment of the invention. Most of the elements of device 200 are similar or identical to elements of device 10 which have already been described above. Therefore, like elements of device 200 are identified by like reference numerals and the above description of these elements in relation to device 10 applies equally to the description of these elements in device 200.

Device 200 comprises a gas diverter valve 12, a gas/liquid heat exchanger 14 (of which only the mounting plate 44 is shown) and a flow duct 16 having features which are similar or identical to those of valve 12, heat exchanger 14 and duct 16 of heat recovery device 10.

In heat recovery device 200, the rod 84 of valve 12 is mounted to the underside of the valve member 82, such that the pivot axis of valve member 82 is located approximately midway between its leading edge 202 and its trailing edge 204, similar to the arrangement shown in FIGS. 1-3. As can be seen from FIG. 10, when the valve 12 is opened, the trailing edge 204 of valve member 82 pivots upwardly until it contacts or is located in close proximity to the inner surface of gas conduit 20. The leading edge 202 of valve member 82 rotates downwardly until it comes into overlapping contact with, or is located in close proximity to, the tab 90 of mounting plate 44. Thus, in the heat exchanger mode shown in FIG. 10, the valve member 82 substantially completely blocks bypass flow of the hot gas, and causes substantially all of the gas to flow through heat exchanger 14.

As shown in FIG. 10, the valve 12 includes a support frame 206 which is constructed so as to overlap the leading edge 202 of valve member 82, and so that the trailing edge 204 of valve member 82 overlaps the edge of support frame 206. In this embodiment, the support frame 206 includes a leading end 208 which engages or is in close proximity to the leading edge 202 of valve member 82 with the valve 12 closed, and similarly the support frame 206 includes a trailing end 210 which engages or is located in close proximity to the trailing edge 204 of the valve member 82 when valve 12 is closed. The leading and trailing ends 208, 210 of support frame 206 include sealing surfaces which, in the embodiment of FIG. 10, are in the form of notches 212, 214. At the leading end 208, the notch 212 has a bottom sealing surface which contacts the upper surface of the valve member 82, whereas notch 214 at the trailing end 210 has an upper surface which seals against the underside of the valve member 82. Although FIG. 10 shows notches 212, 214 being provided in the ends of support frame 206, it will be appreciated that notches may instead be formed in the leading and/or trailing edges 202, 204 of valve member 82, as shown in FIG. 9.

FIG. 10 also shows that the inner surface of the conduit 20 is provided with a ridge 216 which extends into the gas flow path and forms a seal with the edges of the valve member 82. The ridge 216 may extend around the entire inner surface of conduit 20 so as to provide a stop for the valve member 82 and to seal with substantially the entire edge of valve member 82 which is rotated upwardly into conduit 20 during opening of the valve 12, i.e. the trailing end and the sides of the valve member 82. The ridge 216 is located downstream of the center line of flow duct 16 (shown as dotted line) and also downstream of pivot axis P and rod 84, thereby reducing valve rotation to less than 90 degrees between the closed and open positions. The centre line of duct 16 divides the inlet end from the outlet end of flow duct 16.

The ridge 216 also provides a diameter reduction in the conduit 20 in the vicinity of the openings 48, 50 in mounting plate 44 which open into the gas inlet and outlet manifolds 30, 32 of heat exchanger 14 (not shown), the diameter reduction being located between openings 48 and 50, toward the outlet opening 50.

In can be seen from FIG. 10 that the direction of pivoting of the valve member 82 is counter-clockwise. Therefore, the flow of gas through conduit 20 will effectively bias the valve toward the closed (bypass) position.

Figure 11A:
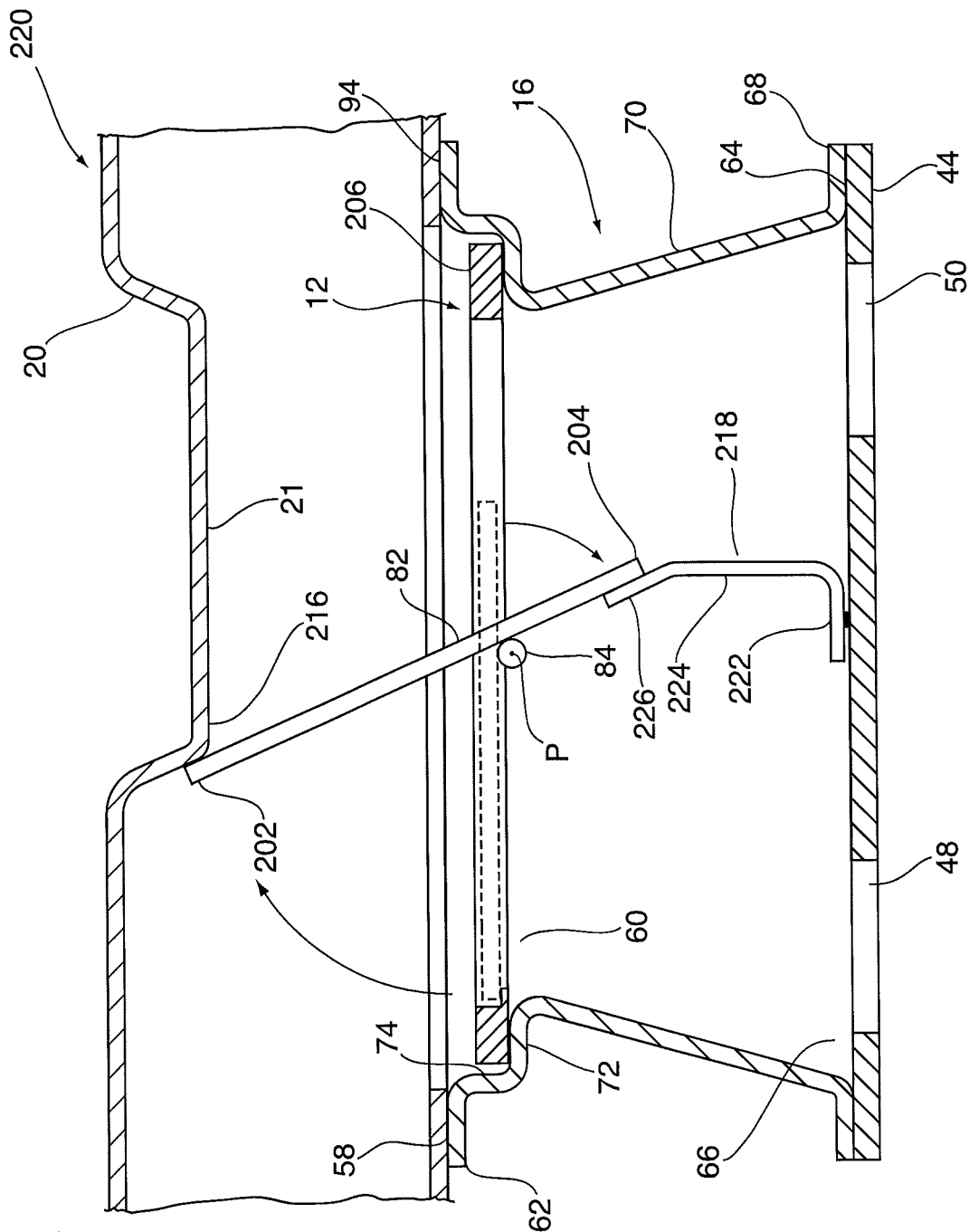
FIG. 11A is a longitudinal cross-section of a heat recovery device according to a further embodiment of the invention.

FIG. 11A illustrates a heat recovery device 220 according to a further embodiment of the invention, which can be regarded as a variation of the embodiment illustrated in FIG. 10. Therefore, like elements of the embodiment of FIG. 11A are referred to using like reference numerals, and the following description focuses on the differences between the heat recovery device 220 of FIG. 11A and the heat recovery device 200 of FIG. 10.

Firstly, it can be seen from FIG. 11A, that the pivot axis P of the valve 12 in FIG. 11A is located closer to the trailing edge 204 than to the leading edge 202 of the valve member 82. In other words, the trailing portion of valve member 82 is shorter than the leading portion. Also, in FIG. 11A the direction of pivoting of valve member 82 is the opposite of that shown in FIG. 10, with the valve member 82 rotating clockwise during opening of valve 12. Therefore, the pressure of the gas flowing through conduit 20 may bias the valve member 82 toward the heat open, heat exchange position.

During opening of valve 12 of FIG. 11A, the leading edge 202 of valve member 82 will be brought into contact with, or close proximity to, the inner surface of conduit 20, and particularly the ridge 216 of conduit 20. In FIG. 11, the ridge 216 comprises a sloped edge of an inwardly extending portion 21 of conduit 20, the inwardly extending portion 21 extending downstream from ridge 216 along the trailing end of valve 12, and will therefore provide a venturi effect in bypass mode, as described above.

The trailing edge 204 of valve member 82 will be rotated until it is brought into contact with, or in close proximity to, a tab 218 protruding from the mounting plate 44. Due to the shorter length of the trailing portion of valve member 82, it can be seen that the tab 218 in FIG. 11A has a greater height than the tab 90 of FIG. 10. Alternatively, the height of the duct wall 70 may be reduced so as to reduce the distance between the valve 12 and the mounting plate 44, without substantially sacrificing the thermal break distance effect provided by the duct 16.

As can be seen from FIG. 11A, when the valve 12 is closed (indicated in dotted lines) there will be an opening toward the outlet end of flow duct 16 in the bypass position. Although sealing of the flow duct 16 in the bypass mode ensures thermal isolation of the heat exchanger 14 from the hot gas in duct 20, the physical separation of the heat exchanger 14 from duct 20 provided by flow duct 16 may provide adequate thermal conduction separation of the heat exchanger 14 from the hot gas flow in some embodiments of the invention, even though the valve 12 may not completely seal the opening 60 of flow duct 16.

Although tab 218 may be integrally formed from the mounting plate 44, as in FIG. 2, the tab 218 is shown in FIG. 11A as comprising a spring-like member constructed of relatively thin sheet metal and which is secured to the top surface of mounting plate 44 by any convenient means, such as brazing, welding or by mechanical attachment. As shown in FIG. 11A, the tab 218 has an attachment flange 222 which is parallel to mounting plate 44, and through which the tab 218 and mounting plate 44 are connected. Extending at about 90 degrees from the flange 222 the tab 218 has a middle portion 224 extending vertically toward valve 12, to block bypass gas flow in the heat exchange mode. Extending at an angle from middle portion 224 is a sealing end portion 226 which is angled relative to middle portion 224 so as to seal against the trailing edge 204 of valve member 82 in the heat exchange position.

When the trailing edge 204 of valve member 82 seats against the end portion 226 of tab 218, the resilience of tab 218 provides a slight spring force which may help the actuator close the valve 12, particularly where the valve member 82 must rotate against the gas flow to close the valve, as in the embodiment of FIG. 11A. The tip 226 of barrier 218 may optionally be curved (convex in relation to valve member 82) to enhance this spring effect, while maintaining good valve seating. With this embodiment, in addition to the spring effect of the barrier 218, the temporary bypass channel created between tip 226 and the rotating valve member 82 will also help the actuator close the valve 12 by providing a gas bypass path until the valve 12 closes.

Figure 11B:
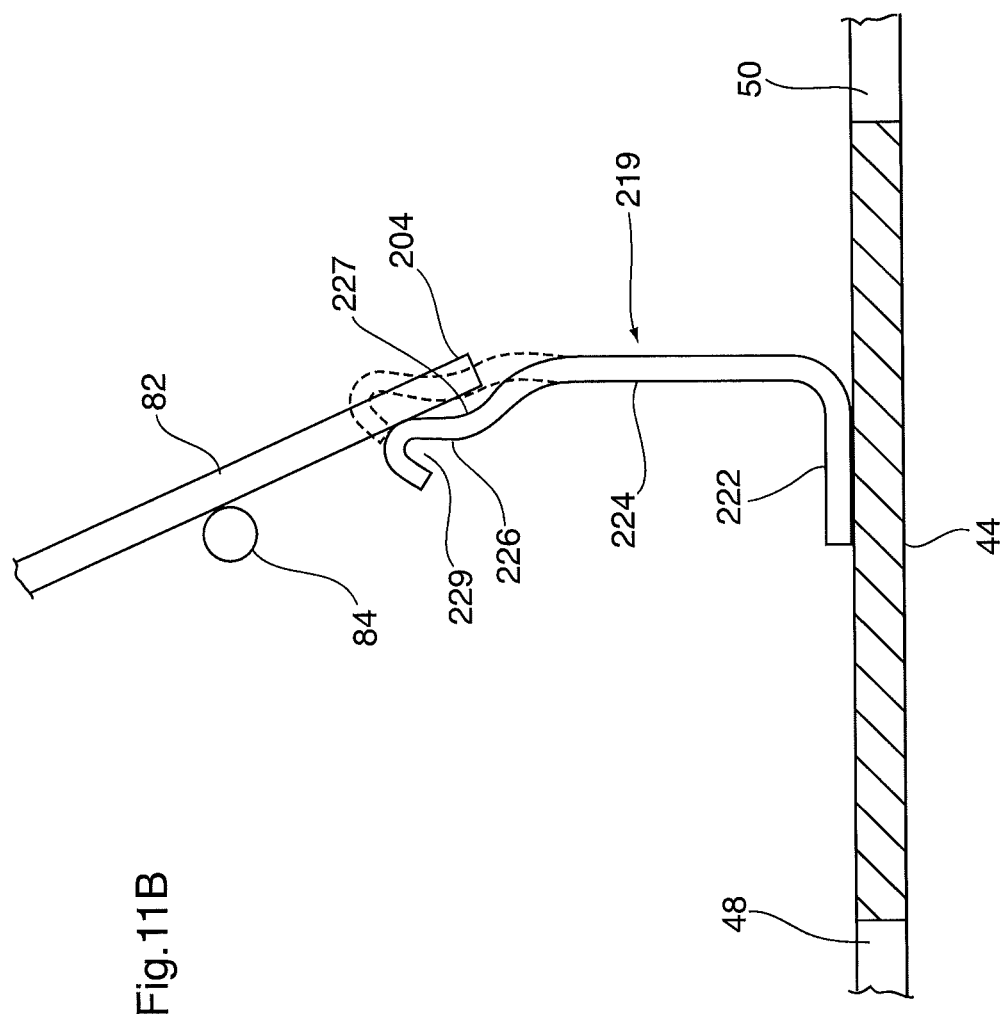
FIG. 11B is a enlarged close-up of a portion of a heat recovery device similar to that shown in FIG. 11A.

FIG. 11B illustrates a slightly different configuration of tab 219 which may be used in the heat recovery device 220 of FIG. 11A. The tab 219 of FIG. 11B has an attachment flange 222 and a middle portion 224 similar in function and appearance to the corresponding elements of tab 218 in FIG. 11A. However, the tip 226 of tab 219 has two opposed curves 227 and 229 to provide additional resilience during valve seating. In FIG. 11B, the seated position of tab 219 (i.e. engaging the valve member 82) is shown in solid lines, and the unseated position of the tip 226 (i.e. out of engagement with valve member 82) is shown in dotted lines.

Figure 12A:
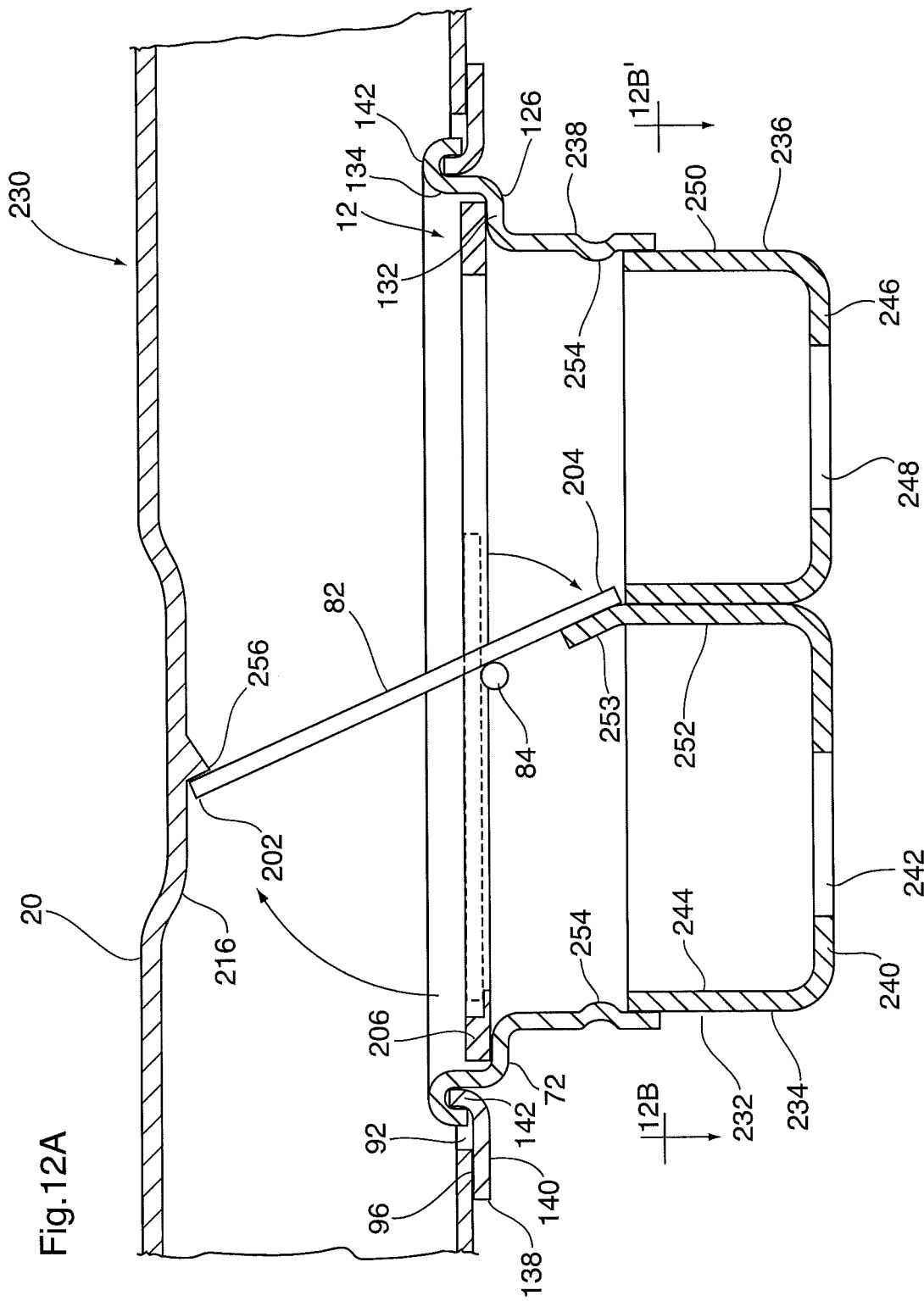
FIG. 12A is a longitudinal cross-section of a heat recovery device according to a further embodiment of the invention.
Figure 12B:
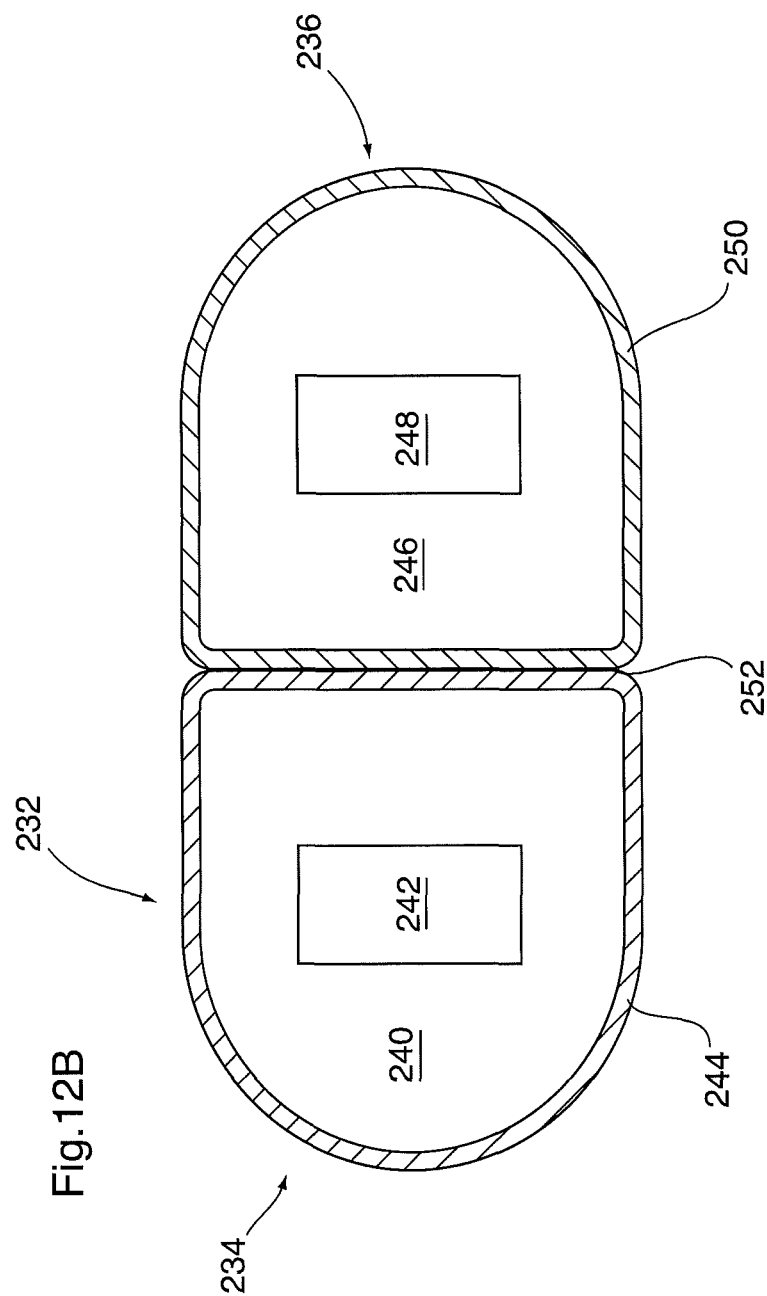
FIG. 12B is a cross-sectional plan view along line 12B-12B' of FIG. 12A.

FIGS. 12A and 12B show a heat recovery device 230 according to a further embodiment of the invention which may be regarded as a variation of the embodiment illustrated in FIG. 11A. Therefore, like elements of the embodiment of FIG. 12A are referred to using like reference numerals, and the following description focuses on the differences between the heat recovery device 230 of FIG. 12A and the heat recovery device 220 of FIG. 11A.

The main differences between the embodiments of FIGS. 11A and 12 are in the structure of the flow duct. The embodiment of FIG. 12A includes a modified flow duct 232 comprising a plurality of components, namely an inlet base portion 234, an outlet base portion 236 and upper side wall portion 238.

The inlet and outlet base portions 234, 236 are both formed from drawn sheet metal cups arranged back-to-back. The inlet base portion 234 includes a bottom wall 240 having a gas inlet opening 242 which is shaped and sized to align with the gas inlet manifold opening 48 of the mounting plate 44 (not shown), where one is provided, and with the gas inlet manifold opening 40 of the heat exchanger 14 (not shown). The inlet base portion 234 also includes a side wall 244 upstanding from the bottom wall, and extending about the entire periphery of bottom wall 240. Similarly, the outlet base portion 236 has a bottom wall 246 provided with a gas outlet opening 248 which is sized and shaped to align with the gas outlet manifold opening 50 of mounting plate 44, where one is provided, and with the gas outlet manifold opening 42 of the heat exchanger 14. The outlet base portion 236 has an upstanding side wall 250 which completely surrounds the periphery of the bottom wall 246. The bottom walls 240, 246 of base portions 234, 236 are flat and planar, so as to form a seal with either the mounting plate 44, where one is provided, or directly with the bottom plate 38 of heat exchanger 14 where the mounting plate 44 is eliminated. Although openings 242 and 248 are shown in the plan view of FIG. 12B as being rectangular, they may be of different shapes than those shown.

The side walls 244 and 250 of the base portions 234, 236 have planar portions which are arranged back-to-back as shown in FIG. 12B, so as to form a tab structure or dividing wall 252 having a similar appearance and function as the tab 218 in FIG. 11A, which seals to the valve member 82 in the heat exchange position to achieve a bypass seal. The planar portion of one of the side walls 244, 250 may be extended to provide a tip 253 similar in function to the tip 226 of tab 218 described above. In FIG. 12A the side wall 244 of inlet base portion 234 has a planar portion which is extended relative to the planar portion of side wall 250.

The other portions of walls 244, 250 of the inlet and outlet base portions 234, 236 serve to enclose the duct 232. As shown in the plan view of FIG. 12B, the walls 244, 250 of base portions 234, 236 may have rounded sides to give the flow duct 232 an oval shape when viewed in plan. This shape may be preferred where the opening in the gas duct is oval shaped. It will be appreciated that the shape of base portions 234, 236 is variable and depends at least partly on the configuration of the heat exchanger 14 and the flow duct.

As shown in FIG. 12A, the tops of the side walls 244, 250 form a lower portion of the duct wall, and the upper portion comprises upper side wall portion 238 which, as shown in FIG. 12A, may overlap with the top edges of side walls 244, 250. The inner surface of upper side wall portion 238 may be provided with dimples 254 close to its lower edge which form stops to prevent over-insertion of the side walls 244, 250 into the upper side wall portion 238.

The upper side wall portion 238 terminates at the top of duct 232, and provides a nesting surface 72 for the valve 12, and has a flange structure similar to that shown in the embodiment of FIGS. 5, 6A and 6B. Therefore, further discussion of the top portion of the upper side wall portion 238 is not necessary.

FIG. 12A also shows that the wall of gas conduit 20 is formed with a ridge 216 which reduces the diameter of the conduit 20 in the vicinity of heat exchanger 14. Protruding from the ridge 216 is an optional valve seat which comprises an angled shoulder 256 which extends into the conduit 20 from ridge 216. The seat 256 has an angled seating surface which overlaps with the leading edge 202 of the valve member 82.

FIG. 13 illustrates a heat recovery device 300 according to a further embodiment of the invention, which is similar to the heat recovery device 230 shown in FIGS. 12A and 12B, and like reference numerals are used to identify like elements.

Heat recovery device 300 comprising a flow duct 232 comprising an inlet portion 234 and an outlet portion 236 which extend the full height of flow duct 232, thereby eliminating the need for an upper side wall portion 238 as in FIG. 12A.

The inlet and outlet portions 234, 236 are both formed from drawn sheet metal cups arranged back-to-back. The inlet portion 234 includes a bottom wall 240 having a gas inlet opening 242, and the outlet portion 236 has a bottom wall 246 provided with a gas outlet opening 248. The inlet portion 234 also includes a side wall 244 upstanding from the bottom wall 240, and the outlet portion 236 has an upstanding side wall 250 which completely surrounds the periphery of the bottom wall 246. The side walls 244 and 250 of the base portions 234, 236 have planar portions which are arranged back-to-back as shown in FIG. 12B, so as to form a dividing wall 252 which extends throughout substantially the entire height of duct 232 and prevents the hot gas from bypassing the heat exchanger in heat exchange mode. When viewed in plan the inlet and outlet portions 234, 236 may have the same shape as shown in FIG. 12B.

The top of duct 232 in FIG. 13 may have the same flange structure as in FIG. 12A, and provides a nesting surface 72 for the valve 12, having a flange structure similar to that shown in the embodiment of FIGS. 5, 6A and 6B. Therefore, further discussion of the flange structure in FIG. 13 is not necessary.

The top of dividing wall 252 may be provided with a V-groove 302 in which the valve rod 84 is received. This V-groove is formed by inwardly bending the upper edge of the planar portion of each sidewall 244, 250.

The valve 12 of heat recovery device 300 has a different configuration than that of device 230. In particular, the valve 12 includes a support frame 206 and valve rod 84 as described above, however, the valve member 82 is a one-sided flap valve, having only a leading portion which covers only the inlet portion 234 of flow duct 232, leaving the outlet portion 236 open to the flow of hot gas with the valve 12 in the bypass position, i.e. with the valve member 82 in the position shown in solid lines in FIG. 13. The valve member 82 moves into the heat exchange position by pivoting clockwise about axis P until the leading edge 202 of valve member 82 seats against the inner surface of gas conduit 20, shown in dotted lines in FIG. 13. With the valve member 82 in the heat exchange position, it can be seen that the dividing wall 252 together with valve member 82 substantially completely prevent the flow of hot gas to bypass the heat exchanger 14 (not shown in FIG. 13).

As shown in FIG. 13, both the leading edge 202 of valve member and the leading edge of support frame 206 may be notched to provide enhanced sealing when the valve is closed.

As an alternative construction, the one-sided flap comprising valve member 82 may cover the outlet portion 236 in the bypass configuration, as shown by the dotted line representation of the valve member 82 in its closed position. This may improve the venturi effect, since the open inlet portion 234 may act as an expansion chamber ahead of the closed outlet portion 236.

Figure 14A:
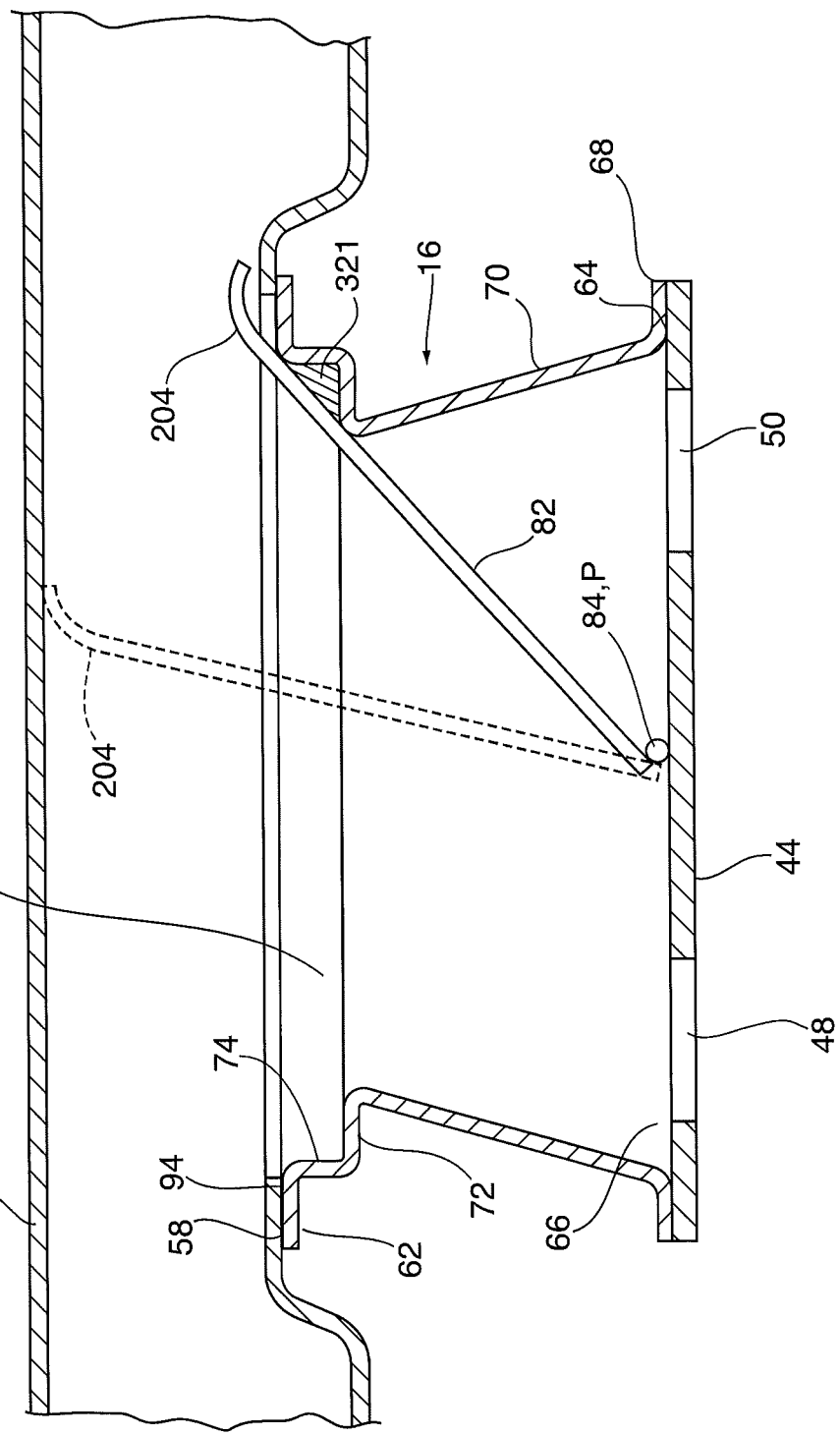
FIG. 14A is a longitudinal cross-section of a heat recovery device according to a further embodiment of the invention.
Figure 14B:
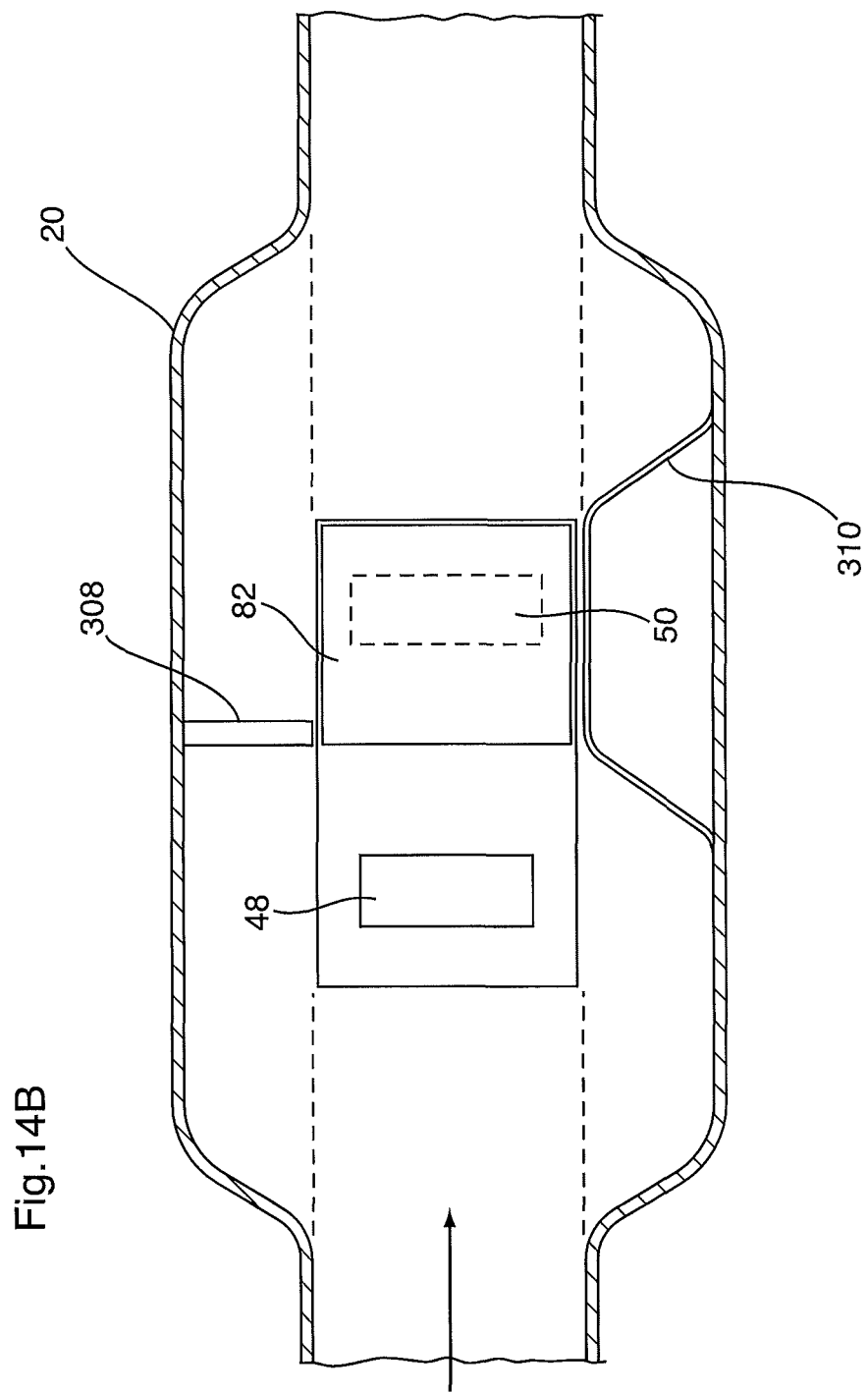
FIG. 14B is a cross-sectional plan view through the gas duct to which the heat recovery device of FIG. 14A is mounted.

FIG. 14A illustrates a heat recovery device 320 according to a further embodiment of the invention, which includes a flow duct 16 having a similar configuration to that shown in FIGS. 10 and 11A, mounted to the mounting plate 44 of a heat exchanger 14 (not shown). Like elements of heat recovery device 320 are therefore identified with like reference numerals as are used above with reference to FIGS. 10 and 11A. The flow duct 16 is mounted to a gas conduit 20 similar to those described above, with the exception that the gas conduit 20 is flattened and formed into the shape of an oval in the vicinity of flow duct 16, and may have an oval shape in plan, as shown in FIG. 14B. Although the oval shape of conduit 20 is described herein as relating specifically to the embodiment shown in FIG. 14A, it will be appreciated that the appearance of conduit 20 in FIG. 14B can apply equally to any embodiment of the invention described herein.

The heat recovery device 320 has a valve structure which is significantly different from the embodiments described above. In particular, valve member 82 is attached at one end to valve rod 84 to provide a one-sided or cantilevered flap similar to that of FIG. 13. However, the valve rod 84 and pivot axis P are located in close proximity to the heat exchanger 14 and/or the mounting plate 44 thereof, and in close proximity to the opening 66 at the bottom of duct 16. This arrangement avoids overheating of the valve rod 84 and/or the bearings (not shown) of the valve.

As shown in solid lines in FIG. 14A, the valve member 82 seals the exhaust opening 50 of mounting plate 44 in the closed, bypass position, and seats against the upper edge of flow duct 16. The flow duct may or may not include the nesting surface 72 and vertical shoulder 74 shown in FIG. 14A, and may be provided with a valve seat 321 which is engaged by the valve member 82 in the bypass position. This is similar to one of the configurations shown in FIG. 13, and permits the inlet side of duct 16 to act as an expansion chamber, to enhance the venturi effect. As shown in dotted lines, the valve member 82 rotates counter clockwise to the open, heat exchange position with the trailing edge 204 of valve member sealing against the wall of conduit 20.

The trailing edge 204 of valve member has a curved extension which does not significantly protrude into or restrict conduit 20 in the closed position, but which seals against the wall of conduit 20. Thus, the curved extension helps to minimize the amount of rotation needed to move between the open and closed positions and may help the valve member 82 to seat with the inside of the conduit 20.

The flattened shape of conduit 20 helps to minimize the length requirements for valve member 82. However, as shown in FIG. 14B, the flattened portion of conduit 20 has a width which is significantly greater than the width of the valve member 82, thereby creating bypass flow passages on either side of the valve member 82. FIG. 14B shows that this bypass flow can be minimized by including a structure which prevents gas flow around the valve member 82. The structure can include an inwardly protruding sidewall 308 or an elongate rib 310 extending along the valve member 82. As shown by dotted lines in FIG. 14B, the width of valve member 82 is substantially the same as the width of the conduit 20 upstream and downstream of the flattened and widened portion of conduit 20.

Figure 15:
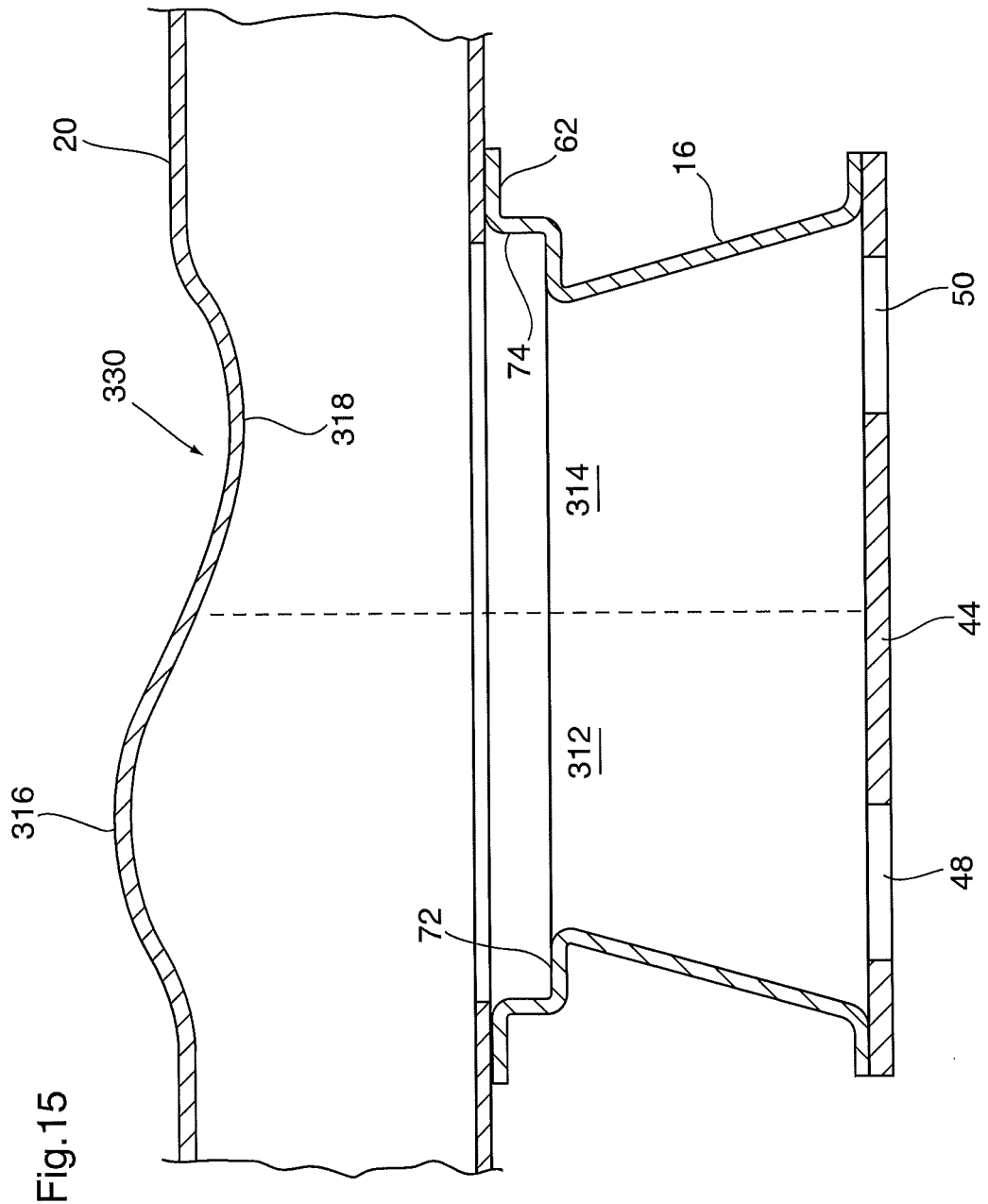
FIG. 15 is a longitudinal cross-section of a heat recovery device according to a further embodiment of the invention.

FIG. 15 illustrates a heat recovery device 330 according to a further embodiment of the invention. For clarity, only the mounting plate 44, flow duct 16 and gas conduit 20 are shown in FIG. 15. The conduit 20 is configured for ideal gas flow geometry, having an outward protrusion 316 of the conduit wall at the inlet side 312 of device 330, and an inward protrusion 318 of the conduit wall at the outlet side 314 of device 330. This configuration of conduit 20 creates an expansion chamber at the inlet side 312 and a restriction at the outlet side 314 to create the beneficial venturi effect described above.

Figure 16:
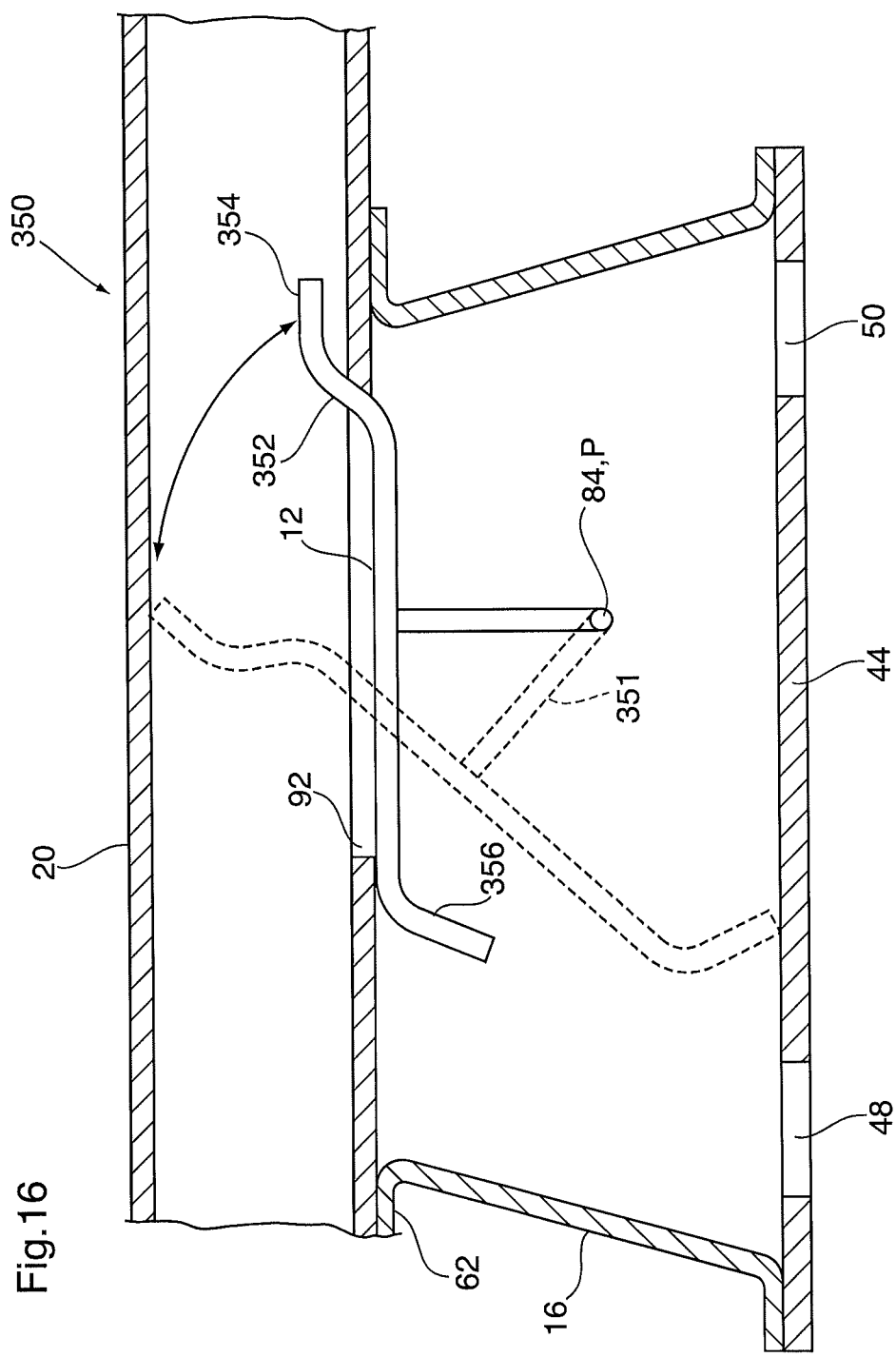
FIG. 16 is a longitudinal cross-section of a heat recovery device according to a further embodiment of the invention.

FIG. 16 illustrates a heat recovery device 350 according to a further embodiment of the invention. For clarity, only the mounting plate 44, flow duct 16, gas conduit 20 and valve 12 are shown in FIG. 16. The flow duct 16 has a somewhat simpler construction than that shown in FIG. 15, eliminating the nesting surface 72 and vertical shoulder 74. In addition, the edges of the opening 92 of conduit 20 extend inwardly of the top of flow duct 16 for reasons which will become apparent below.

The valve 12 of FIG. 16 is significantly different from the valves described above. In this regard, the valve 12 comprises a valve member 82 which is rigidly mounted to the first end of an arm 351, for example at an angle of about 90 degrees, and wherein the second end of arm 351 is mounted to the valve rod 84 for pivoting about axis P. In the closed position shown in solid lines in FIG. 16, the leading edge of valve member 82 seals against one of the protruding edges of conduit 20, and the trailing edge of valve member 82 seals against the protruding edge of conduit 20 at the opposite end of opening 92. The trailing edge of valve member 82 may have an upturned end portion 352 which seats against the edge of conduit 20 and a trailing end portion 354 extending parallel to the direction of gas flow. The leading edge of valve member 82 may have a downturned end portion 356.

To open the valve 12, the valve member 82 and arm 351 are rotated counter clockwise about axis P until the trailing edge of valve member 82 seats against the inner surface of conduit 20, and the leading edge of valve member 82 seats against the mounting plate 44 or the heat exchanger 14 (not shown), where no mounting plate is provided. It can be seen that the upturned end portion 352 and the downturned end portion 356 of valve member 82 help to reduce the amount of rotation which are needed to open the valve 12. The trailing end portion 354 of the valve member provides a similar effect, and may also help the valve member 82 to seat against the inner surface of conduit 20. It will be appreciated that the point of attachment of arm 351 to the valve member 82 can be moved along the length of valve member 82 to accommodate changes in height in the flow duct 16 and/or the gas conduit 20. In other words, the valve member 82 may be mounted to arm closer to its leading edge or trailing edge, and is not necessarily mounted to the arm 351 midway along its length. It will be appreciated that changing the mounting point of arm 351 on valve member 82 may require displacement of the pivot axis P.

Figure 17:
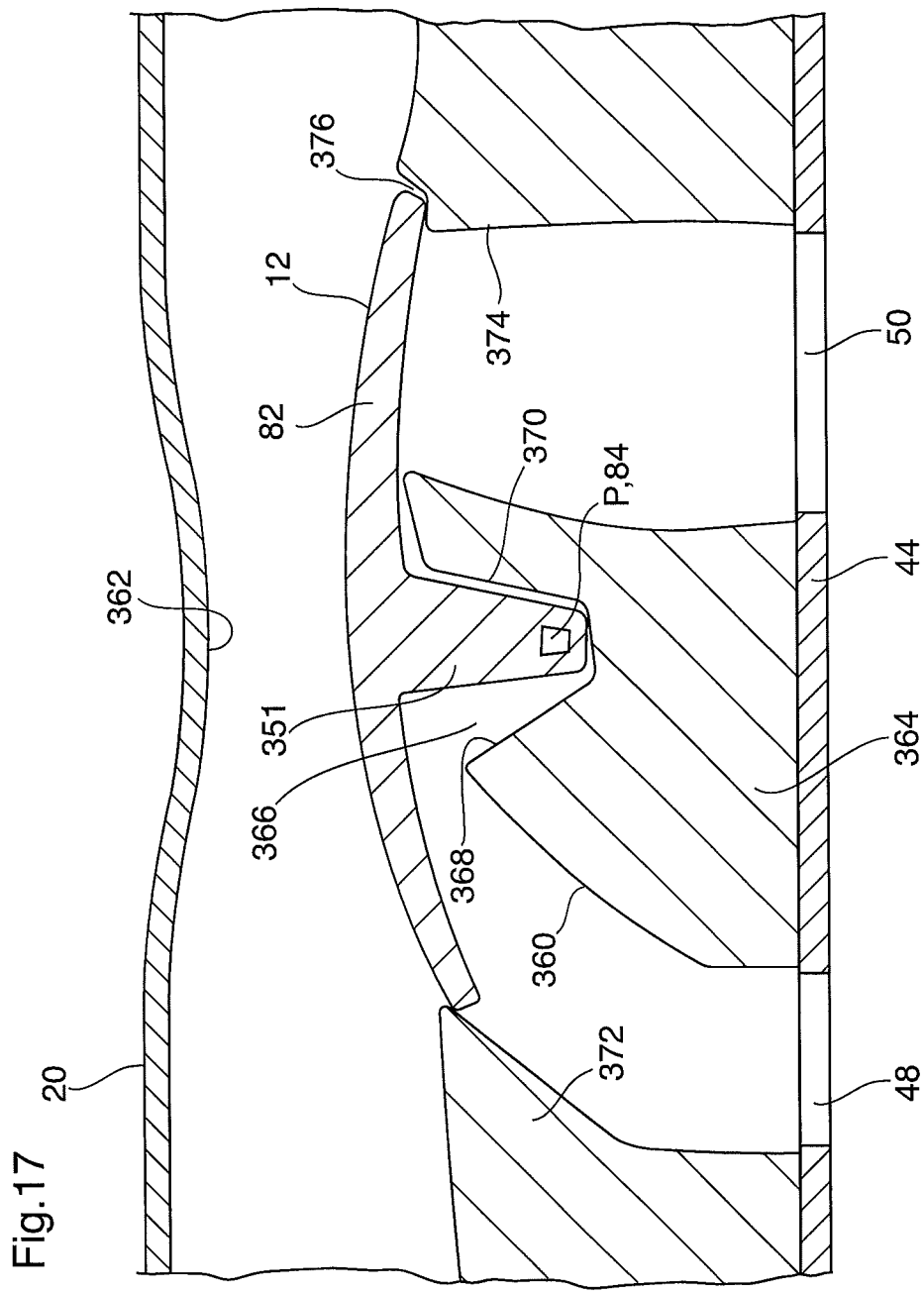
FIG. 17 is a longitudinal cross-section of a heat recovery device according to a further embodiment of the invention, with the valve closed.
Figure 18:
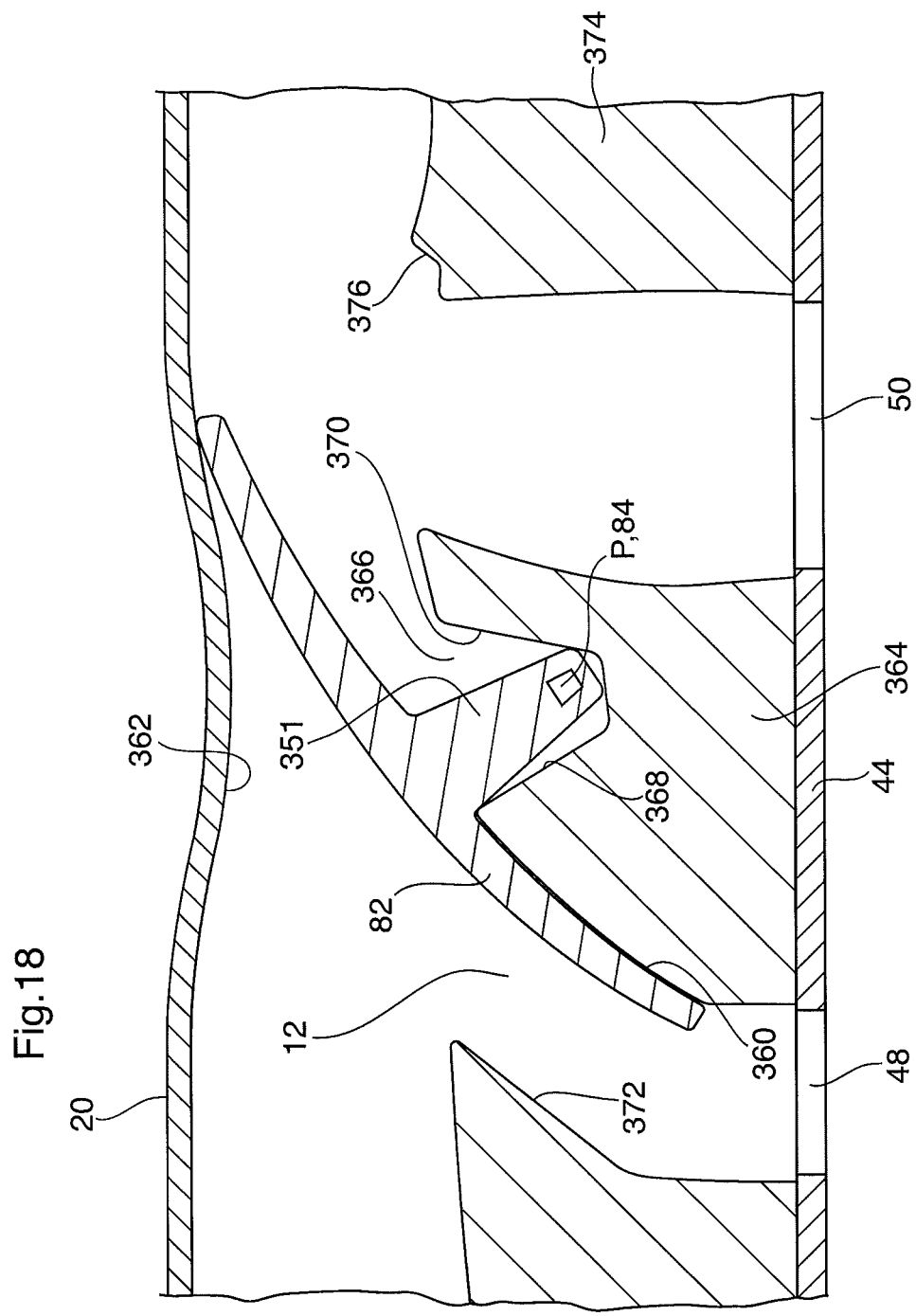
FIG. 18 shows the heat recovery device of FIG. 17 with the valve open.

FIGS. 17 and 18 illustrate a variant of the valve 12 of FIG. 16, in which the valve 12 comprises a valve member 82 rigidly mounted to the first end of an arm 351, for example at an angle of about 90 degrees, and wherein the second end of arm 351 is mounted to the valve rod 84 for pivoting about axis P. The arm 351 may be mounted in a groove or channel 366 of a mounting block 364 which may in turn be mounted on the mounting plate 44 or bottom plate (not shown) of heat exchanger 14 (not shown). The groove 366 may have a forward wall 368 which limits forward movement of the arm 351 toward the heat exchange position of FIG. 18, and a rearward wall 370 which limits rearward movement of the arm 351 toward the bypass position of FIG. 17. As shown in FIG. 17, the arm 351 engages rearward wall 370 with valve 12 in the bypass position and, as shown in FIG. 18, the arm 351 engages forward wall 368 with valve 12 in the bypass position.

In the embodiment of FIGS. 17 and 18, the valve member 82 has an upwardly curved surface which produces a restriction in the conduit 20, with valve 12 in the bypass position shown in FIG. 17, so as to produce the beneficial venturi effect described above. In the illustrated embodiment, the wall of conduit 20 opposite to the valve member 82 includes an inward protrusion 362 which protrudes into the gas flow path to further restrict flow in the vicinity of valve 12.

The valve 12 of FIGS. 17 and 18 also differs from that shown in FIG. 16 in that the leading edge of the valve member 82 does not rotate down into contact with mounting plate (not shown) or heat exchanger (not shown) when the valve 12 is moved to the open position. Rather, the forward wall of mounting block 364 forms a blocking wall 360 against which the leading portion of valve member 82 (i.e. the portion forward of arm 351 seats in the open position of FIG. 18. The blocking wall 360 may extend from the mounting plate 44 or bottom plate (not shown) of heat exchanger (not shown), and prevents bypass flow under the leading edge of the valve member 82 with the valve 12 in the heat exchange position.

With the valve 12 in the bypass position, the leading edge of valve member 82 seals against the underside of an inlet surface 372 and the trailing edge of valve member 82 seals against the top of an outlet surface 374, optionally being seated in a notch 376 therein, as shown in FIG. 17. Also, as mentioned above, the arm 351 engages rearward wall 370 to limit movement of the valve member 82.

With the valve in the heat exchange position, the arm 351 is tilted forward to engage forward wall 368. Also, as shown in FIG. 18, the underside of the valve member 82 engages the blocking wall 360 so as to provide open flow communication from the conduit 20 to the heat exchanger 14 through opening 48. Also, the upper surface of valve member 82, at the trailing edge thereof, engages the inner surface of conduit 20, such that the valve member 82 and the blocking wall 360 together block bypass flow and force substantially all the gas flowing through conduit 20 to pass through the heat exchanger 14.

It will be appreciated that the valve 12 of FIGS. 17 and 18 may be modified so that the leading edge of valve member 82 will be brought into contact with the mounting plate 44 or the top plate 38 of heat exchanger 14 when it is moved to the heat exchange position shown in FIG. 18. This may eliminate the need for blocking wall 360. Also, although the mounting block 364, inlet surface 372 and outlet surface 374 are shown in FIGS. 17 and 18 as solid blocks, it will be appreciated that it may not have this appearance in practice. For example, the blocking wall 360 may be in the form of a sheet metal flow blocker which may have an appearance similar to that of the tab 218 of FIG. 11A, except that it may be shifted toward the inlet opening proximate to the leading edge of valve member 82. The blocking wall 360 functions primarily as a bypass blocker, to prevent bypass flow of the hot gas in the heat exchange mode.

While the provision of a flow duct 16 such as that described above enhances the thermal isolation of the heat exchanger 14 from the flow of hot gas through an exhaust conduit 20, it will be appreciated that some applications lack sufficient space for provision of a flow duct 16 between exhaust conduit 20 and heat exchanger 14, and demand a more compact construction. The embodiments of FIGS. 19-22, now discussed below, address this issue.

Figure 19:
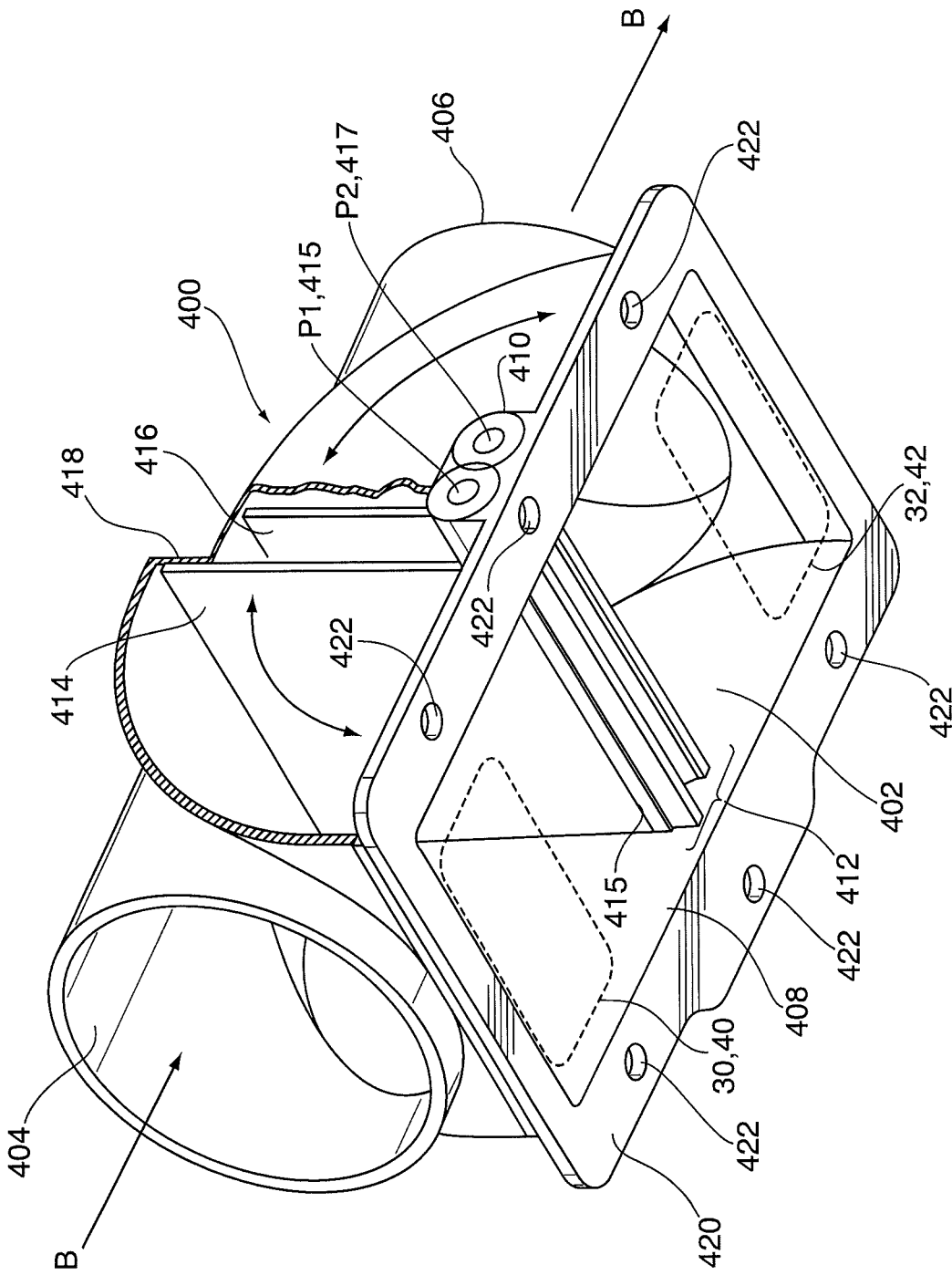
FIG. 19 is a partially cut away, bottom perspective view of the gas flow duct of a heat recovery device according to a further embodiment of the invention.
Figure 20:
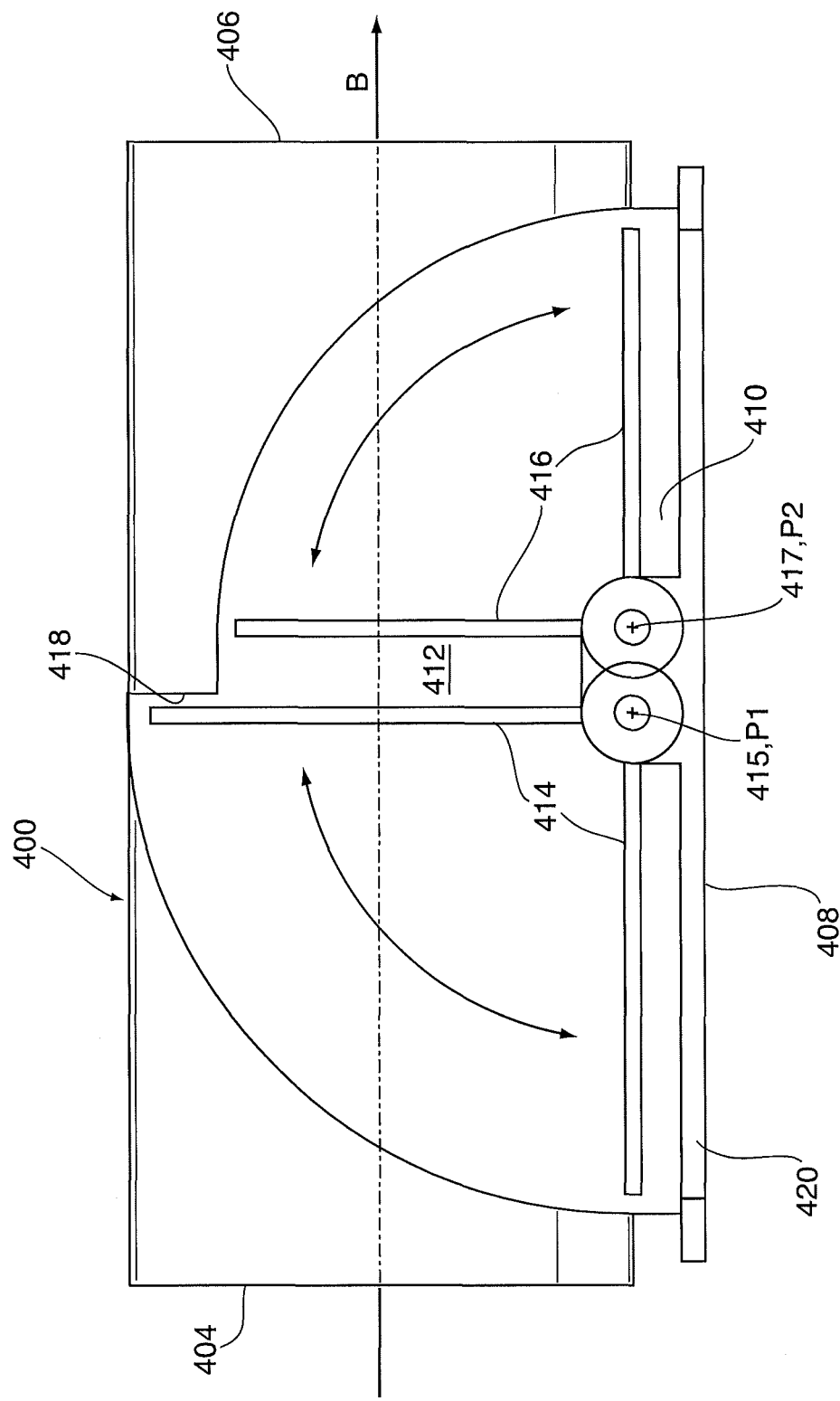
FIG. 20 is a partially cut away side elevation view of the gas flow duct of FIG. 19.

FIGS. 19-20 illustrate a compact gas flow duct 400 of a heat recovery device according to a further embodiment. It will be appreciated that the heat recovery device of FIGS. 19-20 will also include a heat exchanger, which may be similar or identical to heat exchanger 14 described above. To allow the features of gas flow duct 400 to be clearly shown, the heat exchanger 14 is not shown in FIGS. 19-20. However, FIG. 19 shows the location of the gas inlet manifold 30/manifold opening 32, and the gas outlet manifold 40/manifold opening 42, in dotted lines.

Gas flow duct 400 combines functions and features of the inlet/outlet duct 16 and gas conduit 20 of heat recovery device 10 described above. In this regard, the gas flow duct 400 includes a hollow interior chamber 402, a first open end 404 and a second open end 406 spaced apart from one another along a bypass gas flow direction indicated by arrows B in FIG. 19. A bypass gas flow passage is defined along the bypass gas flow direction B, through the hollow interior chamber 402 between the first and second ends 404, 406. The gas flow duct 400 will be installed in the exhaust pipe of a motor vehicle, with the exhaust gases flowing through the open ends 404, 406 of the gas flow duct 400.

The gas flow duct 400 further comprises at least one opening 408 through which flow communication is provided between the interior chamber 402 and the gas inlet and outlet manifolds 30, 32 of heat exchanger 14, i.e. through the gas inlet and outlet manifold openings 40, 42. The at least one opening 408 is located between the first and second ends 404, 406 of the gas flow duct 400. The gas flow duct 400 of FIGS. 19-20 includes one continuous opening 408 providing communication between the heat exchanger 14 and the interior chamber 402, the opening 408 being provided in a base 410 of the gas flow duct 400. However, it will be appreciated that separate openings 408 may be provided for each of the manifolds 30, 32 and manifold openings 40, 42 of heat exchanger 14.

The heat recovery device of FIGS. 19-20 further comprises a gas diverter valve 412 comprising a first valve member 414 and a second valve member 416. The valve members 414, 416 are both located within the hollow interior chamber 402 of the gas flow duct 400. The valve members 414, 416 are mounted on pivot rods 415, 417 and are pivotable about pivot axes P1 and P2, respectively. As shown, the pivot axes P1 and P2 may be parallel to each other, and transverse to the bypass gas flow direction B. Also, the pivot axes P1 and P2 are spaced apart from one another along the bypass gas flow direction B.

The valve members 414, 416 of FIGS. 19-20 each comprise a one-sided flap having a leading edge and a trailing edge spaced apart along the bypass gas flow direction B. It will be understood that the trailing edge of each valve member 414, 416 is located downstream of the leading edge, along the bypass gas flow direction B, as seen in the closed position (described below). The valve members 414, 416 in this embodiment are flat and have a substantially rectangular shape, with the (shorter) leading and trailing edges being substantially transverse to the bypass gas flow direction B, and the two longer sides being substantially parallel to the bypass gas flow direction B. However, it will be appreciated that the shapes of the valve members 414, 416 can be varied.

Each valve member 414, 416 is pivotable about its pivot axis P1, P2 between a closed position and an open position. In the closed position, shown in FIG. 20, the valve members 414, 416 combine to substantially completely block the opening 408 so as to substantially prevent flow communication between the hollow interior chamber 402 and the gas inlet and outlet manifolds 30, 32 of the heat exchanger 14. Therefore, the area of opening 408 is slightly greater than the combined areas of the valve members 414, 416. Furthermore, it can be seen from the drawings that the first valve member 414 substantially prevents flow communication between the hollow interior chamber 402 and the gas inlet manifold 30, whereas the second valve member 416 substantially prevents flow communication between the hollow interior chamber 402 and the gas outlet manifold 32.

With the valve members 414, 416 in the closed position, the gas flow duct 400 is in bypass mode, and substantially all the gas will be forced to flow through the bypass gas flow passage from the first open end 404 to the second open end 406. In this configuration, little or no gas will pass through the heat exchanger 14, thereby providing thermal isolation of the heat exchanger 14 from the hot gas stream, and reducing unwanted heating of the coolant flowing through the heat exchanger 14.

With the valve members 414, 416 in the open position, as shown in FIG. 19, the valve members 414, 416 are positioned out of blocking relation with the opening 408, thereby permitting flow communication between the hollow interior chamber 402 and the gas inlet and outlet manifolds 30, 32 of the heat exchanger 14. With the valve members 414, 416 in the open mode shown in FIG. 19, the gas flow duct 400 is in heat exchange mode. In heat exchange mode, the bypass gas flow passage will be substantially blocked, at least by the first valve member 414, which is located upstream of the second valve member 416. This will force substantially all the gas to flow through the heat exchanger 14, where it is cooled before re-entering the interior chamber 402 and exiting the gas flow duct 400 through the second end 406.

As mentioned above, the valve members 414, 416 comprise one-sided flaps, and therefore the pivot axis P1, P2 of each valve member 414, 416 is proximate to either the leading or trailing edge. For example, in the illustrated embodiment, pivot axis P1 is located proximate to the trailing edge of the first valve member 414, and pivot axis P2 is located proximate to the leading edge of the second valve member 416, such that the valve members 414, 416 pivot in opposite directions. It will be appreciated that this configuration may not be essential in all embodiments of the invention. For example, pivot axis P1 may instead be proximate to the leading edge of first valve member 414, and/or pivot axis P2 may be proximate to the trailing edge of second valve member 416.

Although not essential, the first valve member 14 may be at least partially seated and/or sealed against one or more surfaces inside the interior chamber 402, when in the open position. For example, as shown in FIG. 19, the wall of the gas flow duct 400 includes a seating surface 418 which is engaged by the leading edge of the first valve member 414 when in the fully open position shown in FIG. 19. Although not shown in the drawings, it will be appreciated that the wall of the gas flow duct 400 may also include surfaces which are engaged by the longer sides of first valve member 414, so as to provide additional sealing around the edges of the first valve member 414.

In the illustrated embodiment, both valve members 414, 416 pivot through an arc of about 90 degrees between the closed and open positions. However, it will be appreciated that this is not necessarily the case. For example, the maximum amount of pivoting may be less than 90 degrees, depending at least partly on the desired size and shape of the gas flow duct 400. Furthermore, since the blocking of the bypass gas flow passage is accomplished primarily by the first valve member 414, the degree of pivoting of the second valve member 416 is relatively unimportant, and can be varied. For example, the maximum open angle of the second valve member 416 can be regulated so as to improve gas flow dynamics at the exit side of the gas flow duct 400. In addition, the shape of the second valve member 416 can be varied so as to improve gas flow dynamics. For example, the second valve member 416 may be curved instead of flat. In other embodiments of the invention, the second valve member 416 may perform the primary blocking function of the bypass gas flow passage.

As mentioned above, opening 408 is provided in the base 410 of gas flow duct 400. The base 410 may be provided with a planar flange 420 through which the gas flow duct 400 is attached to the heat exchanger 14. For example, the heat exchanger 14 may optionally include a mounting plate 44 with bolt holes 46 which align with bolt holes 422 of flange 420, to permit the gas flow duct 400 and heat exchanger 14 to be mechanically fastened together, with a gasket 52 provided between the flange 420 and the mounting plate 44. However, it will be appreciated that other forms of attachment are possible. For example, the gas flow duct may be attached or integrally formed with a housing which surrounds the heat exchanger 14, or the flow duct 400 may be configured to be directly attached to the bottom plate 38 of heat exchanger 14, for example by brazing or welding.

It can be seen that the provision of valve members 414, 416 in the form of one-sided flaps permits the gas flow duct 400 to have a relatively compact configuration. In this regard, the use of one-sided flaps makes it possible to provide the pivot axes P1, P2 in close proximity to the heat exchanger 14, and thereby eliminate the need for a duct 16 to provide clearance for rotation of a "butterfly" type valve, where the pivot axis is located about midway between the leading and trailing edges of the valve member. In the embodiment of FIGS. 19-20, the pivot axes P1, P2 are proximate to the opening 408, i.e. spaced slightly above opening 408, and are located in the base 410 of the gas flow duct 400, and the one-sided construction of valve members 414, 416 ensure that they remain substantially entirely within the interior chamber 402 (and out of contact with heat exchanger 14) during pivoting of the valve members 414, 416 between their open and closed positions.

Figure 22:
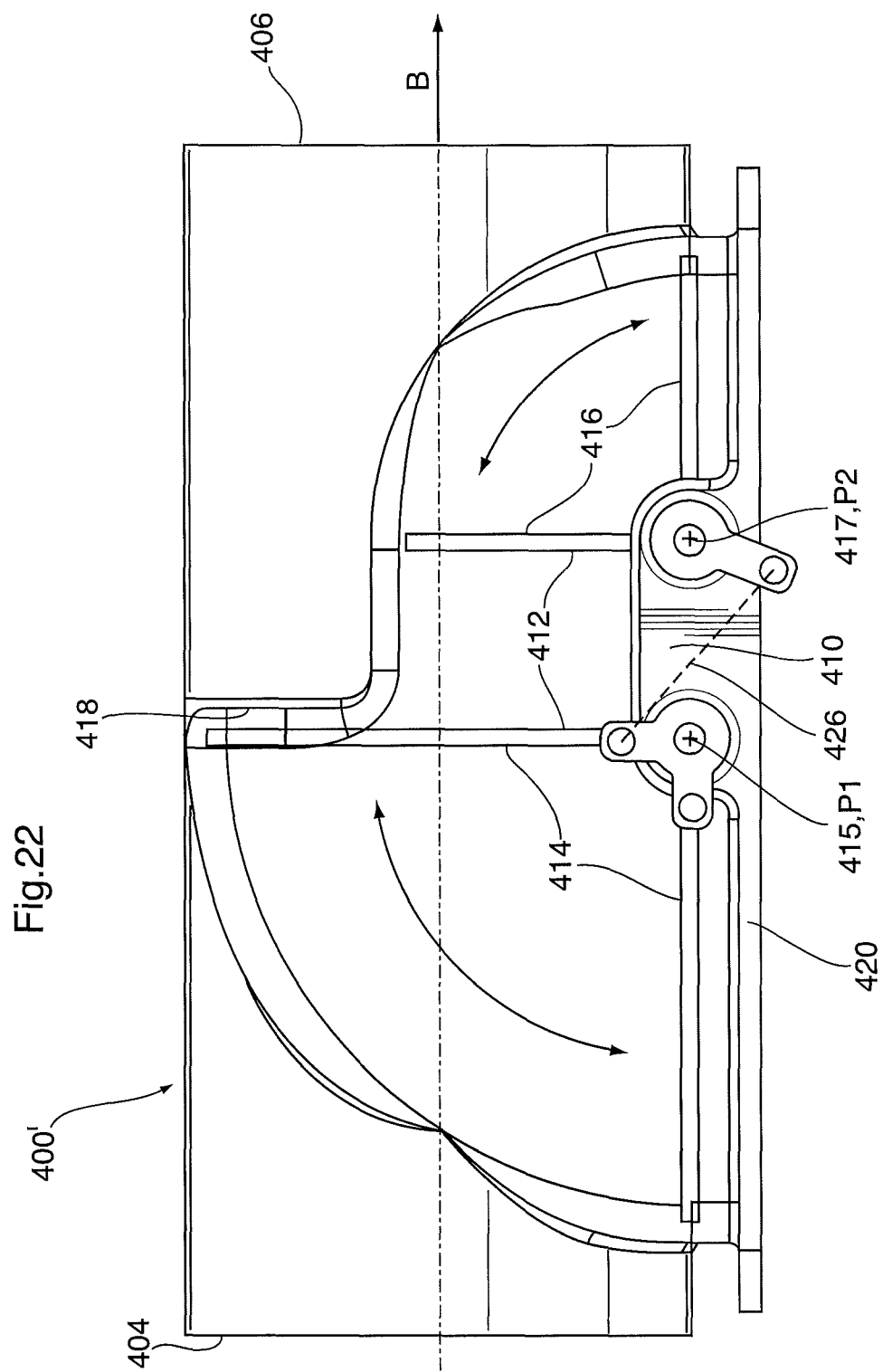
FIG. 22 is a partially cut away side elevation view of the gas flow duct of FIG. 21.

It will be appreciated that the pivoting movement of valve members 414, 416 is controlled by one or more external actuators, and that the valve members 414, 416 can be independently controlled/moveable. Alternatively, the pivoting of valve members 414, 416 can be controlled by a single actuator and the pivot axes P1/P2 and pivot rods 415, 417 of valve members 414, 416 can be connected by gears, lobes, linkages or the like. For example, as shown in FIG. 22, the ends of pivot rods 415, 417 may be provided with lobes connected by a linkage 426, such as a rod, for common control by a single actuator (not shown). The end of pivot rod 415 may be provided with a second lobe, as shown, for connection to the actuator.

Figure 21:
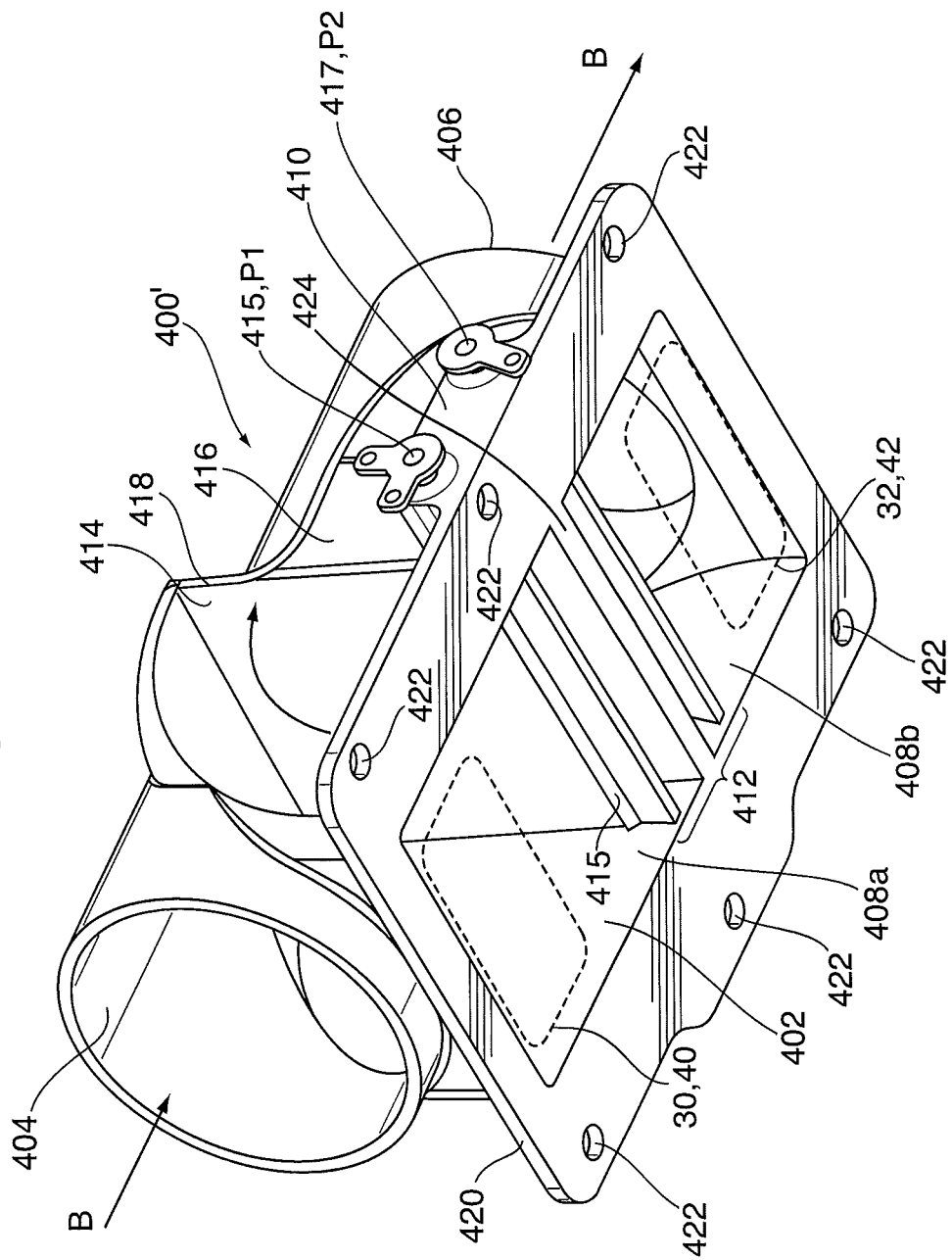
FIG. 21 is a partially cut away, bottom perspective view of the gas flow duct of a heat recovery device according to a further embodiment of the invention.

In the embodiment of FIGS. 19-20, the pivot axes are close together along the bypass gas flow direction B. However, it will be appreciated that the separation of the valve 412 into two separate valve members 414, 416 provides flexibility in that the degree of separation between the pivot axes P1, P2 can be increased to accommodate different configurations of heat exchangers, which may have a more elongate structure. For example, FIGS. 21-22 illustrate a gas flow duct 400' for a heat recovery device, in which the pivot axes P1 and P2 are spaced slightly farther apart so as to accommodate a more elongate heat exchanger configuration. Like elements of gas flow duct 400' are identified by like reference numerals, and the above description of these elements applies equally to gas flow duct 400'.

In addition to the more elongate shape of gas flow duct 400', it can be seen that the opening 408 is divided into two portions, an upstream opening 408a and a downstream opening 408b, the two openings 408a, 408b being divided by a transverse cross member 424. In this embodiment, the first valve member 414 blocks the upstream opening 408a and the second valve member 416 blocks the downstream opening 408b, but the construction and operation of gas flow duct 400' is otherwise the same as that of gas flow duct 400 described above.

In the embodiments shown in FIGS. 19-22, it will be appreciated that the gas flow conduit 20 can be contoured as in the embodiments described above so as to provide a venturi effect inside the gas flow conduit 20 in the bypass mode.

Although the invention has been described in connection with certain preferred embodiments, it is not limited thereto. Rather, the invention includes all embodiments which may fall within the scope of the following claims.

What is claimed is:

1. A heat recovery device for an exhaust system of a motor vehicle, the heat recovery device comprising a gas diverter valve, a gas/liquid heat exchanger and a flow duct, the heat recovery device being adapted for attachment to a gas flow conduit comprising an exhaust pipe in the exhaust system of the motor vehicle,
    the gas flow conduit being a separate component from said heat recovery device;
    the gas diverter valve comprising a valve member movable between a bypass position and a heat exchange position;
    the gas/liquid heat exchanger comprising a plurality of gas flow passages, a gas inlet manifold and a gas outlet manifold in flow communication with said gas flow passages;
    the flow duct having a top and a bottom and comprising:
    (a) a top sealing surface along which the flow duct is adapted to seal to a sealing surface of said gas flow conduit, the top sealing surface being located at the top of the flow duct, the top sealing surface surrounding and being separate from a top opening in the top of the flow duct, wherein the top sealing surface comprises a top sealing flange, wherein the top sealing flange is flat and planar, extends along the top of the flow duct, and is located outwardly of and separate from the top opening;
    (b) a duct wall extending from the bottom to the top of the flow duct and enclosing an interior of the flow duct, wherein the interior of the flow duct is in flow communication with the gas flow passages of the heat exchanger;
    wherein the gas diverter valve further comprises a flat, planar support frame which defines a valve opening in which the valve member is pivotably received, wherein the valve member is adapted to substantially completely block the valve opening in the bypass position; and
    wherein the valve opening is separate from and smaller than the top opening in the flow duct.

2. The heat recovery device of claim 1, wherein the flow duct further comprises:
    (c) a bottom sealing surface along which the flow duct is secured to the heat exchanger, the bottom sealing surface surrounding a bottom opening in the flow duct through which the interior of the duct is in flow communication with the gas flow passages of the heat exchanger.

3. The heat recovery device according to claim 2, wherein the gas/liquid heat exchanger further comprises a mounting plate having a gas inlet manifold opening and a gas outlet manifold opening, the openings of the mounting plate aligning with the respective gas inlet manifold and gas outlet manifold of the heat exchanger;
    wherein the bottom sealing surface of the duct is secured to the mounting plate;
    wherein an edge of the valve member engages an upstanding tab extending from the mounting plate into the interior of the duct, with the valve member in the heat exchange position;
    wherein the upstanding tab engages and overlaps an edge of the valve member when the valve member is in the heat exchange position;
    wherein the upstanding tab is angled relative to the mounting plate by an angle of less than 90 degrees, such that the valve member engages the tab when rotated from the closed to the open position by less than 90 degrees;
    wherein the upstanding tab comprises a resilient spring-like member which is constructed of sheet metal which is thinner than the mounting plate, and is secured to a top surface of the mounting plate;
    wherein resilience of the upstanding tab is adapted to provide a spring force which biases the valve member toward the closed position when the valve member is engaged with the tab.

4. The heat recovery device of claim 1, the valve member comprising a flapper which is pivotably mounted on a rod so as to be movable between said bypass position and said heat exchange position; and
   wherein the flow duct further comprises a planar nesting surface surrounding the top opening of the flow duct and located between a peripheral edge of the top opening and the top sealing flange, and wherein the support frame is received on top of the nesting surface;
   wherein the planar support frame has a lower sealing surface which is aligned with and sealed to the planar nesting surface.

5. The heat recovery device of claim 4, wherein the top sealing flange surrounds the nesting surface and is separated therefrom by a shoulder, such that the nesting surface is recessed relative to the top sealing flange.

6. The heat recovery device of claim 5, wherein a leading edge or a trailing edge of the valve member overlaps with an edge of the nesting surface or the top sealing flange; and
   wherein at least one of the valve member and the nesting surface or the top sealing flange is notched in an area of said overlap.

7. The heat recovery device of claim 4, wherein the top sealing flange surrounds the nesting surface, wherein the top sealing surface further comprises an upstanding flange portion which is surrounded by the flat, planar top sealing flange;
   wherein the top sealing flange is separated from the nesting surface by the upstanding flange portion;
   wherein the upstanding flange portion is part of the top sealing surface and projects upwardly therefrom; and
   wherein the upstanding flange is separate from the top sealing flange and the nesting surface, and is located between the top sealing flange and the nesting surface.

8. The heat recovery device of claim 1, further comprising a flow vane located proximate to a leading edge of the valve member when the valve is closed, wherein the flow vane has a smoothly contoured surface, wherein the flow vane is attached to the support frame, and wherein the flow vane extends from the support frame so as to extend part way across the valve opening and overlap the leading edge or the trailing edge of the valve member when the valve is closed and with the valve member in the bypass position; and
   such that the smoothly contoured surface of the flow vane provides a rounded inlet surface along which exhaust gases from the gas flow conduit flow into the heat exchanger when the valve member is in the heat exchange position.

9. The heat recovery device of claim 1,
   wherein one face of the support frame is secured to the top sealing flange of the duct and the opposite face of the support frame is adapted to seal to said sealing surface of said gas flow conduit; and
   wherein the top sealing flange extends inwardly from the duct wall.

10. The heat recovery device according to claim 1, wherein the duct comprises first and second base portions, each having a bottom wall with an opening in alignment with one of the gas inlet manifold and the gas outlet manifold of the heat exchanger, wherein back-to-back walls of the base portions form a central dividing wall which extends upwardly from the bottom walls, and divides the duct into two portions throughout a portion of its height; and
   wherein the duct further comprises an upper side wall portion extending between the base portions and the valve.

11. The heat recovery device according to claim 1, wherein the gas diverter valve further comprises an arm having a first end and a second end, wherein the first end of the arm is rigidly attached to the valve member and the second end of the arm is pivotable about a pivot axis, such that the valve member is movable between the bypass position and the heat exchange position by pivoting the arm.

12. The heat recovery device of claim 11, wherein the valve member includes an angled end portion proximate to at least one of a leading edge and a trailing edge of the valve member, wherein the angled end portion extends from the valve member in a direction toward a surface which said leading or trailing edge of the valve member will engage when in the heat exchange position.

13. The heat recovery device of claim 11, wherein said valve member has an upper curved surface which, when the heat recovery device is joined to said gas flow conduit, protrudes into the gas flow conduit and causes a reduction in a cross-sectional area of the conduit in the vicinity of the valve member.

14. The heat recovery device of claim 1, wherein the interior of the flow duct is provided with an upstanding dividing wall which separates an inlet side of the flow duct from an outlet side of the flow duct, and which extends throughout substantially the entire height of the flow duct, wherein the dividing wall substantially prevents bypass flow in the heat exchange position;
   wherein the gas diverter valve comprises one said valve member which pivots about a pivot axis which is located proximate to either a leading edge or a trailing edge of the valve member, such that only one said valve member pivots about the pivot axis; and
   wherein the pivot axis is proximate to the dividing wall.

15. The heat recovery device of claim 1, wherein the flow duct further comprises a bottom opening through which the interior of the flow duct is in flow communication with the gas flow passages of the heat exchanger;
   wherein the gas diverter valve comprises one said valve member which pivots about a pivot axis at either a leading edge or a trailing edge of the valve member, such that only one said valve member pivots about the pivot axis; and
   wherein the pivot axis of the valve member is at the bottom opening.

16. In combination, a heat recovery device and a gas flow conduit, wherein the gas flow conduit comprises an exhaust pipe in an exhaust system of a motor vehicle, wherein the heat recovery device comprises a gas diverter valve, a gas/liquid heat exchanger and a flow duct and is a separate component from said heat recovery device;
   wherein the gas flow conduit has an opening surrounded by a flat, planar sealing surface;
   the gas diverter valve comprising a valve member movable between a bypass position and a heat exchange position;
   the gas/liquid heat exchanger comprising a plurality of gas flow passages, a gas inlet manifold and a gas outlet manifold in flow communication with said gas flow passages;
   the flow duct having a top and a bottom and comprising:
   (a) a top sealing surface along which the flow duct is sealed to the flat, planar sealing surface of the gas flow conduit, the top sealing surface surrounding a top opening in the top of the flow duct, wherein the top sealing surface comprises a top sealing flange, wherein the top sealing flange is flat and planar, extends along the top of the flow duct, and is located outwardly of the top opening;
   (b) a duct wall extending from the bottom to the top of the flow duct and enclosing an interior of the flow duct, wherein the interior of the flow duct is in flow communication with the gas flow passages of the heat exchanger;

wherein the sealing surface surrounding the opening of the gas flow conduit is aligned with and sealed to the top sealing flange of the flow duct, such that a sealed, fluid-tight connection is provided between the gas flow conduit and the top of the flow duct.

17. The combination of claim 16, wherein the conduit is flattened in the vicinity of the connection to the top sealing flange of the flow duct, such that the conduit is wider than the valve member, and wherein an interior surface of the conduit is provided with a structure which extends inwardly toward the valve member and which minimizes bypass flow around the sides of the valve member in the heat exchange position;
  wherein the structure includes an inwardly protruding sidewall or an elongate rib extending along the sides of the valve member.

18. The combination of claim 16, wherein a cross-sectional area of said conduit is increased proximate to an inlet side of the flow duct and reduced proximate to an outlet side of the flow duct.

19. The combination of claim 16, wherein the gas diverter valve further comprises a flat, planar support frame which defines a valve opening in which the valve member is pivotably received, wherein the valve member is adapted to substantially completely block the valve opening in the bypass position;
  wherein the valve opening is separate from and smaller than the top opening in the flow duct; and
  wherein the valve opening is separate from and smaller than the opening in the gas flow conduit.

20. A heat recovery device, comprising:
  (a) a gas/liquid heat exchanger comprising a plurality of gas flow passages, a gas inlet manifold, and a gas outlet manifold in flow communication with said gas flow passages;
  (b) a gas flow duct comprising:
    (i) a hollow interior chamber;
    (ii) a first open end and a second open end spaced apart from one another along a bypass gas flow direction, wherein a bypass gas flow passage is defined through the hollow interior chamber between the first and second ends, along said bypass gas flow direction; and
    (iii) at least one opening through which flow communication is provided between the interior chamber and the gas inlet and outlet manifolds of the heat exchanger, wherein said at least one opening is located between the first and second ends of the gas flow duct;
  (c) a gas diverter valve comprising a first valve member and a second valve member, both of which are located within the hollow interior chamber of the gas flow duct, wherein the first valve member is pivotable in a first pivot direction about a first pivot axis between a closed position in which flow communication between the hollow interior chamber and the gas inlet manifold of the heat exchanger is substantially prevented by the first valve member, and an open position in which flow communication between the hollow interior chamber and the gas inlet manifold of the heat exchanger is permitted, and wherein the second valve member is pivotable in a second pivot direction about a second pivot axis between a closed position in which flow communication between the hollow interior chamber and the gas outlet manifold of the heat exchanger is substantially prevented by the second valve member, and an open position in which flow communication between the hollow interior chamber and the gas outlet manifold of the heat exchanger is permitted, wherein the first pivot direction is opposite to the second pivot direction;
  wherein the first pivot axis is spaced apart from the second pivot axis along said bypass gas flow direction, wherein the bypass gas flow passage is substantially completely blocked by the first valve member when the first and second valve members are in their open positions;
  wherein, with both of the valve members in said closed position, the valve members substantially block said at least one opening so as to substantially prevent flow communication between the hollow interior chamber and the gas inlet and outlet manifolds of the heat exchanger;
  wherein the first and second valve members remain substantially entirely within the hollow interior chamber during pivoting of the valve members from their closed positions to their open positions; and
  wherein said at least one opening and the pivot axes are located in a base of the gas flow duct, the base having a planar flange through which the gas flow duct is attached to the heat exchanger.

21. The heat recovery device of claim 20, wherein the second valve member is located downstream of the first valve member along said bypass gas flow direction, and is spaced apart from the first valve member.

22. The heat recovery device of claim 20, wherein each of the valve members comprises a flap having a leading edge and a trailing edge spaced apart along said bypass gas flow direction, and wherein the pivot axis of each said valve member is proximate to the leading or trailing edge thereof, and is transverse to the bypass gas flow direction.

23. The heat recovery device of claim 20, wherein the first and second pivot axes are proximate to said at least one opening.

24. The heat recovery device of claim 20, wherein the first pivot axis is proximate to the trailing edge of the first valve member, and the second pivot axis is proximate to the leading edge of the second valve member.

* * * * *